(12) United States Patent
Sayama et al.

(10) Patent No.: US 7,890,227 B2
(45) Date of Patent: Feb. 15, 2011

(54) VEHICLE-MOUNTED ELECTRONIC CONTROL APPARATUS

(75) Inventors: Masahiko Sayama, Hyogo (JP); Shozo Kanzaki, Tokyo (JP); Kohji Hashimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1117 days.

(21) Appl. No.: 11/202,259

(22) Filed: Aug. 12, 2005

(65) Prior Publication Data
US 2006/0200276 A1 Sep. 7, 2006

(30) Foreign Application Priority Data
Mar. 1, 2005 (JP) ............................. 2005-055789

(51) Int. Cl.
*G01M 17/00* (2006.01)
*G06F 7/00* (2006.01)
*G06F 19/00* (2006.01)

(52) U.S. Cl. .............................. 701/29; 701/1; 701/31; 701/35

(58) Field of Classification Search .............. 701/1, 701/29, 31, 35, 36, 102, 114, 115
See application file for complete search history.

(56) References Cited

U.S. PATENT DOCUMENTS 5,095,438 A * 3/1992 Sasaki ..................... 701/114
6,108,598 A * 8/2000 Sumitani .................. 701/29
2002/0169524 A1* 11/2002 Nakamoto et al. ............. 701/1
2004/0122565 A1* 6/2004 Sakurai et al. ................ 701/1

FOREIGN PATENT DOCUMENTS

JP 06-074087 A 3/1994
JP 07-036574 A 2/1995

OTHER PUBLICATIONS

U.S. Appl. No. 10/953,918, filed Sep. 30, 2004, Masahiko Sayama, et al.
U.S. Appl. No. 10/939,405, filed Sep. 14, 2004, Masahiko Sayama, et al.

* cited by examiner

*Primary Examiner*—Jack Keith
*Assistant Examiner*—Rami Khatib
(74) *Attorney, Agent, or Firm*—Sughrue Mion, PLLC

(57) ABSTRACT

A vehicle-mounted electronic control apparatus can perform a variety of abnormality detections while reducing the control load of a microprocessor in the abnormality detection of a volatile backup memory that is backed up by an on-board battery. The apparatus includes a control CPU which is fed with power from a main power supply circuit upon closure of a power switch, a nonvolatile control memory and a backup memory. Even if the power switch is opened, the backup memory, being a partial area of a RAM memory, is fed with power through an auxiliary power supply circuit connected directly to the battery. When the battery is replaced with a new one and connected again, a power supply interruption monitoring memory is reset. At the start of operation of the control CPU, the backup memory is initialized based on reset information, and the power supply interruption monitoring memory is rewritten into a set state.

8 Claims, 8 Drawing Sheets

Ta: SELF-HOLD PERIOD FOR SAVE OPERATION
Tb: AWAKE TIME
Tc: AWAKE OUTPUT SIGNAL GENERATION RANGE
Td: SELF-HOLD PERIOD FOR AWAKE OPERATION

VEHICLE-MOUNTED ELECTRONIC CONTROL APPARATUS

BACKGROUND OF THE INVENTION

1. Field of the Invention

The present invention relates to a vehicle-mounted electronic control apparatus adapted to be applied, for example, to an engine control apparatus, a vehicle cruise control apparatus, etc. More particularly, it relates to a vehicle-mounted electronic control apparatus capable of reducing a control load on a control microprocessor thereby to enhance control response as well as the reliability of a backup memory by improving how to check the abnormality of the backup memory used with the control microprocessor.

2. Description of the Related Art

In general, a vehicle-mounted electronic control apparatus includes a main power supply circuit that is supplied with electric power from a vehicle-mounted or on-board battery to generate a first stabilized control voltage upon closure of a power supply switch, a microprocessor (control CPU) to which electric power is fed by the main power supply circuit, an auxiliary power supply circuit which is directly fed with electric power from the on-board battery to generate a second stabilized control voltage without passing through the power supply switch, and a volatile backup memory to which electric power is always supplied from the auxiliary power supply circuit or the main power supply circuit.

The control CPU controls a variety of kinds of electric loads in response to the contents of a nonvolatile control memory (e.g., control programs and reference control constants) and the operating states of various input sensors.

The backup memory stores therein learning correction variation value data with respect to the reference control constants in the nonvolatile control memory. A partial area or the whole area of a RAM memory is used as the backup memory, and for instance, learning data to improve driving performance, calibration value data to improve control precision, abnormality occurrence frequency data according to abnormal code numbers, etc., are given as the data stored in such a memory area.

These pieces of storage data have the possibility that their storage contents are changed or lost by the influences of abnormal voltage reduction of the on-board battery, power supply interruption or cut-off upon battery replacement, abnormal noise during operation, etc. Accordingly, pieces of critical or important data are transferred to and stored in a electrically writable nonvolatile data memory so that they can be used as initialization data at the time of data loss.

Here, note that the nonvolatile data memory takes the time required for writing longer than a RAM memory does, and has a limitation to the number of times or frequency of rewritings. Thus, in general, batch transfer writing is executed before a power supply interruption after an engine to be controlled is stopped.

In addition, if data loss occurs by any chance for data of such low significance as can be learned and corrected again, the learning correction variation value data is initialized as initialization data, and the reference control constants stored in the nonvolatile control memory are used as they are, so that it becomes unnecessary to perform data transfer and storage to the nonvolatile data memory, thereby making it possible to reduce or suppress the storage capacity needed in the nonvolatile data memory.

Under such a technical background, it is always required to check whether the contents of the backup memory are normal, and if abnormal, to quickly perform initialization processing.

However, in general vehicle-mounted electronic control apparatuses, as an abnormality detection means for checking or inspecting the contents of the backup memory, there exists no versatile means capable of performing a full check on the backup memory in a short time, and it is known that an excessive emphasis placed on the abnormality check influences the control performance of the microprocessor.

There has been proposed, as one of conventional typical abnormality detection means, an electronic control apparatus that is provided with a backup memory {see, for instance, a first patent document (Japanese patent application laid-open No. H6-74087 (FIG. 3 and Summary))}. The conventional apparatus described in this first patent document includes a backup memory that is always or constantly supplied with battery power and stores pre-specified check data that is irrelevant to control, a control data storage section that stores control data to be updated during the execution of control into the backup memory, an inverted data storage section that stores inverted data which is generated by inverting each bit of the control data into the backup memory when the control data is stored by the control data storage section, a determination section that makes a comparison between the control date stored in the backup memory and the inverted values of the inverted data so as to determine whether they coincide with each other, and an initialization section that writes initial values into the backup memory when the determination section determines that the control data and the inverted values of the control data do not coincide with each other.

Also, the above-mentioned initialization section includes a first section that rewrites the check data into false check data (i.e., values different from the pre-specified values), and a second section that rewrites the check data into the pre-specified check data in place of the false check data after completion of the initialization in which the initial values are written.

Further, the above-mentioned first patent document discloses a mirror check method for comparing the pieces of inverted data with each other, and a keyword verification method using specific check data, whereby the specific check data is replaced from the false data into normal data in response to the completion of initialization, so that the state of interruption of the initialization can be detected, thereby performing initialization in a reliable manner.

In contrast to this, an apparatus and a method for initializing electronic equipment have also been proposed as another prior art {see, for instance, a second patent document (Japanese patent application laid-open No. H7-36574 (FIG. 1 and Summary))}.

According to this second patent document, the initialization apparatus for electronic equipment includes a memory backed up by a voltage served from a power supply (battery), a detection section that detects when the voltage served to the memory reduces below a predetermined value, a storage section that stores information indicating an undervoltage state detected by the detection section, and a control unit that checks the contents of the storage section upon power-on of the electronic equipment, and executes preset initialization processing when information indicating the undervoltage state is stored.

In the case of the conventional apparatus described in the above-mentioned second patent document, the content of the backup memory itself is not checked but instead the presence or absence of an undervoltage abnormality, which becomes a cause to generate abnormal data, is detected, and if an undervoltage abnormality occurs, the backup memory is initialized irrespective of the content thereof.

In the conventional vehicle-mounted electronic control apparatuses, particularly in case of the above-mentioned first patent document, even in a situation where the contents of the backup memory are not reliable because of the presence of the history of a connection interruption or an abnormal voltage reduction of the on-board battery, if no change occurs by chance in the specified check data, there arises a need to verify the inverted data related to the multitude of pieces of storage data, thus posing the problem of requiring a large period of time for abnormality check.

In addition, in case of the above-mentioned second patent document, there is a problem that it is impossible to cope with an abnormality in the backup memory due to a noise-induced malfunction, etc., other than a cell voltage failure, thus resulting in an inability to achieve abnormality detection with high reliability.

SUMMARY OF THE INVENTION

A primary object of the present invention is to obtain a vehicle-mounted electronic control apparatus which is capable of alleviating the control load of a control microprocessor thereby to improve the control response thereof as well as the reliability of backup data by selectively using a plurality of various abnormality detection sections in an appropriate manner at the time of abnormality detection (check) of a backup memory.

A secondary object of the present invention is to obtain a vehicle-mounted electronic control apparatus which is capable of alleviating the control load of a control microprocessor thereby to improve the control response thereof as well as the reliability of backup data by performing abnormality detection (check) processing for a backup memory at a variety of timings such as immediately before the start of operation, immediately after the start of operation, during operation, at the stop of operation, during parking, etc.

A vehicle-mounted electronic control apparatus according to the present invention includes: a main power supply circuit that is connected to an on-board battery through a power switch in such a manner that it is fed with electric power from the on-board battery to generate a first stabilized control voltage when the power switch is closed; an auxiliary power supply circuit that is directly fed with electric power from the on-board battery to generate a second stabilized control voltage; a control CPU composed of a microprocessor including a nonvolatile control memory in which a control program and a reference control constant are written; and a volatile backup memory that is always fed with electric power through the main power supply circuit or the auxiliary power supply circuit so as to store learning correction data for the reference control constant stored in the nonvolatile control memory. The control CPU is connected to a variety of kinds of input sensors and a variety of kinds of electric loads, and is fed with electric power through the main power supply circuit so as to control the electric loads in response to the contents of the nonvolatile control memory and the operating state of the input sensors. The apparatus further includes: a power supply turn-on detection section that detects the turn-on state of the auxiliary power supply circuit; a power supply interruption monitoring memory that responds to a detection operation of the power supply turn-on detection section; an initialization section that initializes the backup memory; an initialization completion storage section that stores an initialization completion state of the initialization section; a hierarchization abnormality detection section that detects an abnormality in hierarchization of the backup memory; and an abnormality detection selection section that selects the execution of abnormality detection by the hierarchization abnormality detection section. The power supply turn-on detection section stores the existence of a power supply interrupted state into the power supply interruption monitoring memory by putting the contents of the power supply interruption monitoring memory into a reset state in response to when the auxiliary power supply circuit is connected to the on-board battery. The initialization section initializes the contents of the backup memory by means of the control CPU in response to when electric power is fed from the main power supply circuit to the control CPU and when the contents of the power supply interruption monitoring memory has not stored a set state. The initialization completion storage section rewrites and changes the contents of the power supply interruption monitoring memory into a set state in response to when the control CPU has completed the initialization of the backup memory, and the initialization completion storage section includes an initialization storage verification section or a voltage monitoring section. The initialization storage verification section verifies whether the rewriting and changing of the power supply interruption monitoring memory has been executed. The voltage monitoring section monitors whether feeding power to the power supply interruption monitoring memory is executed. The hierarchization abnormality detection section comprises a plurality of abnormality detection sections that are executed by the control CPU, and the hierarchization abnormality detection section determines whether there is an abnormality in the memory contents of the backup memory, and initializes the backup memory when an abnormality has been detected in the memory contents of the backup memory. Immediately after the power switch is turned on, even when no abnormality is detected in the execution result of a part of the abnormality detection sections in the hierarchization abnormality detection section, the abnormality detection selection section omits execution of the other abnormality detection sections in the hierarchization abnormality detection section. During operation of the control CPU, the abnormality detection selection section repeatedly executes at least one of the other abnormality detection sections in the hierarchization abnormality detection section in a sequential manner.

According to the present invention, as abnormality detection of the backup memory at the start of operation of the vehicle, it is detected by the initialization storage verification section or the voltage monitoring section that electric power is fed to the main power supply circuit but not to the auxiliary power supply circuit. Also, it is determined, based on the state of a power supply interruption monitoring memory, whether there is a history of connection interruption or abnormal voltage reduction of the on-board battery in the past even if electric power is fed to the auxiliary power supply circuit, and at the time of a connection interruption or abnormal voltage reduction, the control load of the control CPU is reduced by initializing the backup memory, so that control response can be improved, and at the same time the reliability of the backup memory can also be improved.

In addition, during operation of the vehicle, by sequentially executing various abnormality detection schemes in a repeated manner while focusing attention to a change or loss of the contents of the backup memory due to excessively large operating noise, it is possible to prevent an excessive and concentrated control load from being applied to the control CPU, whereby the control load of the control CPU can be reduced, and the control response thereof can be improved, thus making it possible to improve the reliability of the backup memory.

The above and other objects, features and advantages of the present invention will become more readily apparent to those skilled in the art from the following detailed description of preferred embodiments of the present invention taken in conjunction with the accompanying drawings.

DESCRIPTION OF THE PREFERRED EMBODIMENTS

Hereinafter, preferred embodiments of the present invention will be described in detail while referring to the accompanying drawings.

Embodiment 1

Figure 1:
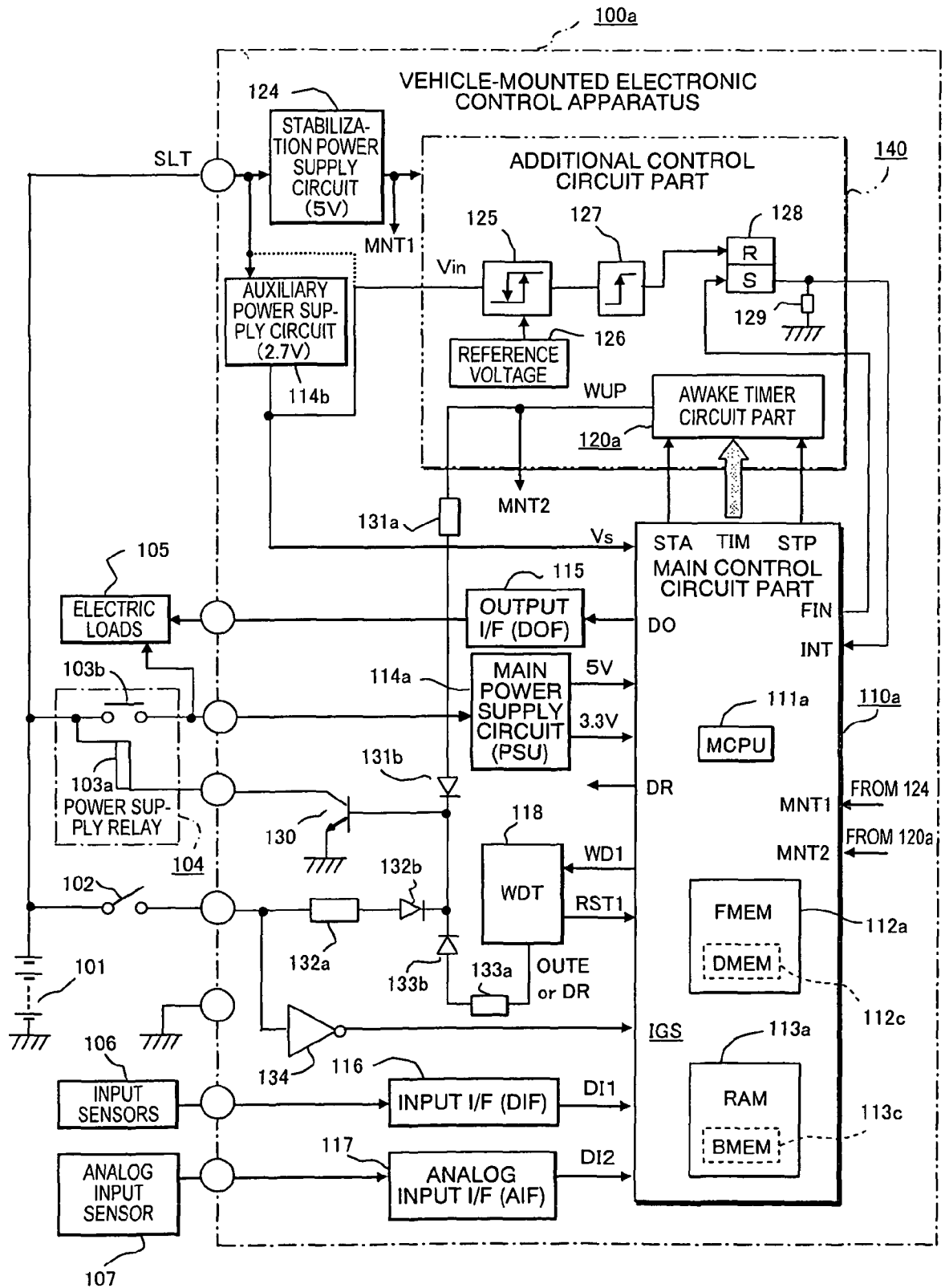
FIG. 1 is a block diagram showing the overall circuit configuration of a vehicle-mounted electronic control apparatus according to a first embodiment of the present invention.
Figure 2:
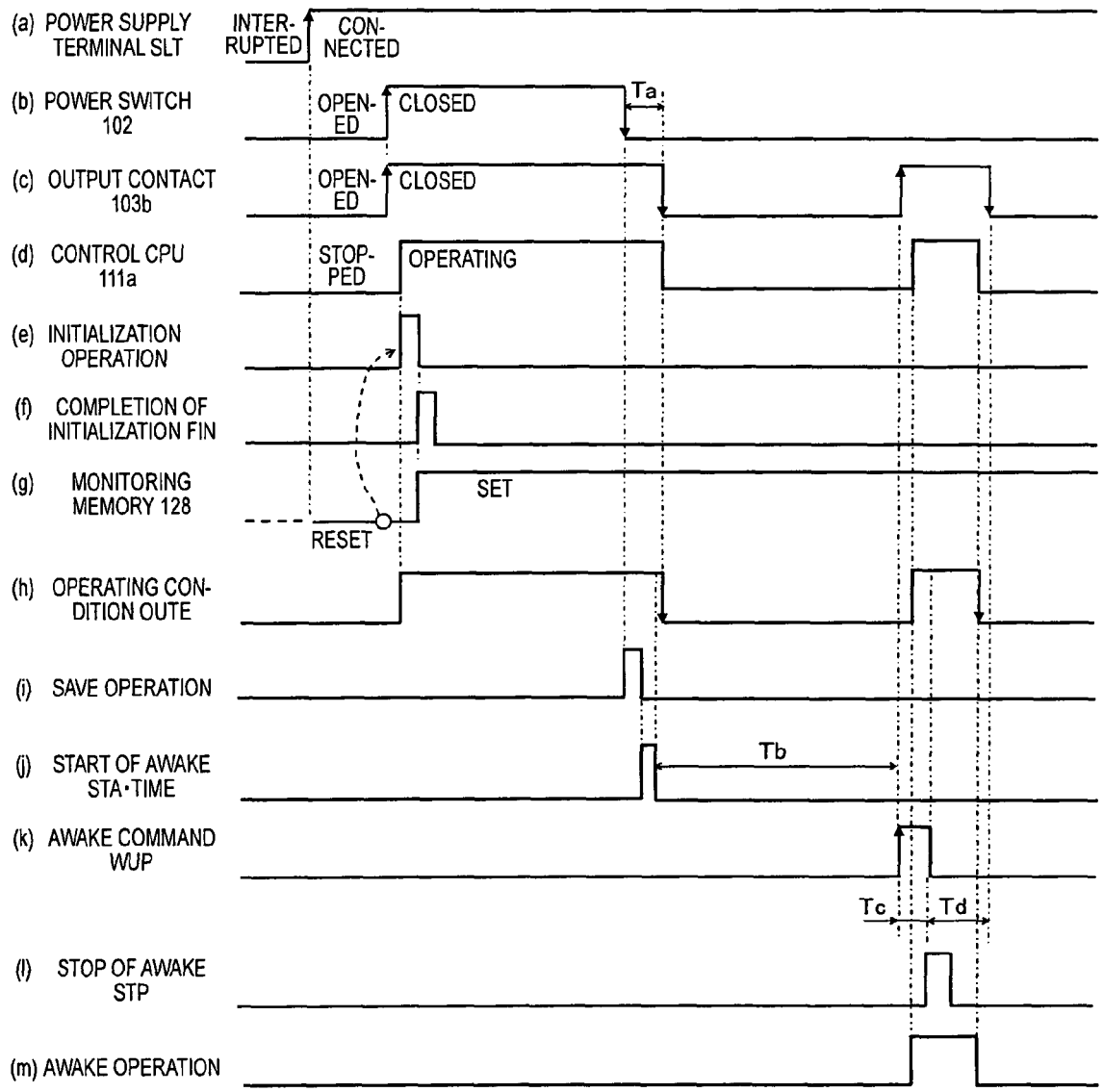
FIGS. 2A through 2M are timing charts illustrating the operation of a power supply circuit according to the first embodiment of the present invention.

FIG. 1 is a block diagram that shows the overall circuit configuration of a vehicle-mounted electronic control apparatus according to a first embodiment of the present invention.

In FIG. 1, the vehicle-mounted electronic control apparatus, generally designated at 100a, is mainly composed of a main control circuit part 110a and an additional control circuit part 140, and is housed in an unillustrated sealed casing.

Connected to the vehicle-mounted electronic control apparatus 100a are a plurality of pieces of external equipment which include an on-board battery 101, a power switch 102, a power supply relay 104 comprising an electromagnetic coil 103a and an output contact 103b (power feed switching element), a variety of kinds of on-board electric loads 105 (indicator equipment or actuators), a variety of kinds of input sensors 106 for detecting the on/off operations of unillustrated input parts (various kinds of operation switches), and an analog input sensor 107.

The input sensors 106 include, for example, a rotation sensor, etc., and also function as an engine state detection section that detects the operating/stopped state of an engine (not shown) to be controlled by the vehicle-mounted electronic control apparatus 100a. Alternatively, the power switch 102 may function as the engine state detection section. In this case, the on/off state of the power switch 102 indicates the operating/stopped state of the engine.

The vehicle-mounted electronic control apparatus 100a includes, in addition to the main control circuit part 110a and the additional control circuit part 140, a main power supply circuit (PSU) 114a that is connected to the on-board battery 101 through the power relay 104 for generating first stabilized control voltages, an auxiliary power supply circuit 114b that is directly connected to the on-board battery 101 for generating a second stabilized control voltage, an output interface circuit (DOF) 115 connected to the electric loads 105, an input interface circuit (DIF) 116 connected to the input sensors 106, an analog input interface circuit (AIF) 117 connected to the analog input sensor 107, a watchdog timer circuit (WDT) 118 connected to the main control circuit part 110a, and a stabilization power supply circuit 124 that is directly connected to the on-board battery 101 for generating a predetermined stabilized voltage.

The vehicle-mounted electronic control apparatus 100a further includes a transistor 130 connected to the power relay 104, a series circuit composed of a drive resistor 131a and a diode 131b connected in series to an awake timer circuit part 120a as a circuit to drive the transistor 130, a series circuit composed of a drive resistor 133a and a diode 133b connected in series to the watchdog timer circuit 118, a series circuit composed of a drive resistor 132a and a diode 132b connected in series to the power switch 102, and an interface element 134 connected to the power switch 102.

The main control circuit part 110a in the vehicle-mounted electronic control apparatus 100a includes a control CPU (MCPU) 111a in the form of a microprocessor, a nonvolatile control memory (FMEM) 112a that cooperates with the control CPU 111a, a nonvolatile data memory (DMEM) 112c in the form of a partial area in the nonvolatile control memory 112a, a RAM memory 113a for arithmetic processing, and a backup memory (BMEM) 113c corresponding to a partial area or the whole area in the RAM memory 113a.

The nonvolatile control memory 112a is composed of a flash memory or the like that stores a control program and reference control constants.

The nonvolatile data memory 112c belongs to a batch deletion block different from the nonvolatile control memory 112a.

The additional control circuit part 140 includes an awake timer circuit part 120a connected to the main control circuit part 110a, a Schmitt circuit 125 that constitutes a power supply turn-on detection section, a reference voltage generation part (not shown) that generates a reference voltage 126 which becomes a comparison criterion or reference in the Schmitt circuit 125, a rising differentiation circuit 127 connected to the Schmitt circuit 125, a flip-flop circuit 128 that constitutes a power supply interruption monitoring memory, and a pull-down resistor 129 connected to the flip-flop circuit 128.

The main power supply circuit 114a is fed with electric power from the on-board battery 101 through the output contact 103b, and supplies the first stabilized control voltages (e.g., DC 5 V and DC 3.3 V) to the main control circuit part 110a. One, DC 5 V, of the first stabilized control voltages is supplied to the main control circuit part 110a as a power supply for the interface circuit, and the other, DC 3.3 V, of the first stabilized control voltages is supplied as a power supply to an arithmetic operation circuit part of the control CPU 111a, the nonvolatile control memory 112a, the nonvolatile data memory 112c, the RAM memory 113a, and the backup memory 113c.

In addition, the main control circuit part 110a is provided with not only the main power supply circuit 114a but also the auxiliary power supply circuit 114b. The auxiliary power supply circuit 114b is fed with electric power directly from the on-board battery 101 through a power supply terminal SLT without passing through the output contact 103b, and generates the second stabilization control voltage (DC 2.7 V). As a result, even if the power switch 102 is opened or turned off, the auxiliary power supply circuit 114b constantly feeds electric power to the backup memory 113c in the main control circuit part 110a.

The output interface circuit 115 includes an output latch memory and a plurality of output transistors (not shown), and is arranged between an output port DO of the control CPU 111a and the variety of kinds of electric loads 105. When either of the plurality of output transistors in the output interface circuit 115 becomes conductive, an electric load 105 connected to the conductive transistor comes to be driven to operate by electric power fed from the on-board battery 101 through the output contact 103b.

The input interface circuit 116 includes a noise filter and a data selector (not shown), and is arranged between the input sensors 106 and an input port DI1 of the control CPU 111a.

The analog input interface circuit 117 includes a noise filter and a multichannel AD converter (not shown), and is arranged between the analog input sensor 107 and an input port DI2 of the control CPU 111a. The analog input interface circuit 117 serves to convert various analog input signals from the analog input sensor 107 into digital values, which are then supplied to the input port DI2 of the control CPU 111a.

The control CPU 111a generates a watchdog clearing signal WD1 comprising a pulse train. The watchdog timer circuit 118 monitors the pulse width of the watchdog clearing signal WD1 from the control CPU 111a, and generates a reset pulse signal RST1 when the pulse width becomes equal to or larger than a predetermined value, so that the control CPU 111a is thereby reset to be reactivated. In addition, when the watchdog clearing signal WD1 is a normal pulse train, the watchdog timer circuit 118 puts the logic level of an operating condition signal output OUTE into an "H" level.

The awake timer circuit part 120a in the additional control circuit part 140 generates an awake output signal WUP in response to an awake operation start command STA, awake time data TIME, and an awake output signal stop command STP which are generated by the control CPU 111a, as shown in timing charts of FIGS. 2A through 2M (to be described later). The awake output signal WUP from the awake timer circuit part 120a is input to the control CPU 111a as an awake monitor signal MNT2.

The stabilization power supply circuit 124 is fed with electric power directly from the on-board battery 101, and constantly supplies a predetermined stabilized voltage (DC 5 V) to the additional control circuit part 140. The predetermined stabilized voltage generated by the stabilization power supply circuit 124 is input to the control CPU 111a as a voltage monitoring signal MNT1.

The Schmitt circuit 125 (the power supply turn-on detection section) in the additional control circuit part 140 has an input terminal connected to an output terminal or an input terminal (see the dotted line) of the auxiliary power supply circuit 114b. The Schmitt circuit 125 includes a threshold setting section for setting a threshold based on the reference voltage 126, and it serves to set a first voltage (threshold) V1 proportional to the reference voltage 126 and a second voltage (threshold) V2 (>V1) that is higher than the first voltage V1.

When it is detected that an input voltage Vin (i.e., an input voltage or an output voltage of the auxiliary power supply circuit 114b) has risen from the first voltage V1 or below to the second voltage V2 or above, the Schmitt circuit 125 puts the contents of the flip-flop 128 (the power supply interruption monitoring memory) into a reset state. That is, the logic level of the output signal of the Schmitt circuit 125 becomes a low level "L" when the input voltage Vin becomes the first voltage V1 or below proportional to the reference voltage 126, and it becomes "H" when the input voltage Vin becomes the second voltage V2 or above proportional the reference voltage 126.

Moreover, the rising differentiation circuit 127 is connected to the output terminal of the Schmitt circuit 125, so that it generates a rising detection output in response to the logic level of the output terminal of the Schmitt circuit 125 being changed from "L" to "H". The rising detection output from the rising differentiation circuit 127 is input to a reset terminal (R) of the flip-flop circuit 128 so that the flip-flop circuit 128 (the power supply interruption monitoring memory) is thereby reset.

The pull-down resistor 129 connected at its one end to the ground is connected at its other end to a set output (S) of the flip-flop circuit 128, and at the same time to the control CPU 111a so that an initialization command signal INT is input to the control CPU 11a. As a result, the initialization command signal INT connected or supplied to the control CPU 111a becomes the low logic level "L" when the logic level of the set output (S) is "L" or the output voltage of the stabilization power supply circuit 124 is not generated. The control CPU 111a initializes the backup memory 113c in response to the initialization command signal INT becoming the logic level "L".

Subsequently, the flip-flop circuit 128 comes to be set by an initialization completion signal FIN from the control CPU 111a in response to the completion of the initialization of the backup memory 113c. However, the flip-flop circuit 128 becomes not reset when the predetermined stabilized voltage from the stabilization power supply circuit 124 is not generated.

The transistor 130 in the vehicle-mounted electronic control apparatus 100a has it one end connected to a one end of the electromagnetic coil 103a connected at its other end to a positive terminal of the on-board battery 101, so that when the power switch 102 is closed or turned on, the transistor 130 is driven into a conductive state through the series circuit comprising the drive resistor 132a and the diode 132b, thus energizing the electromagnetic coil 103a to make the output contact 103b conductive. Further, in response to the control CPU 111a being started to operate due to the conduction of the output contact 103b in the power supply relay 104, the transistor 130 is driven into conduction through the series circuit comprising the drive resistor 133a and the diode 133b by the operating condition signal output OUTE (or self-hold drive command output DR generated by the control CPU 111a) that is generated by the watchdog timer circuit 118. As a result, once the control CPU 111a is started to operate, the output contact 103b in the power supply relay 104 comes to continue its self-hold operation even if the power switch 102 is opened or turned off.

The interface element 134 (the engine state detection section) inputs an inverted logic signal IGS to the control CPU 111a in response to the switching action of the power switch 102. Thus, when the control CPU 111a detects based on the inverted logic signal IGS that the power switch 102 has been opened, it stops all the control outputs including the self-hold drive command output DR and then stops the generation of the watchdog clearing signal WD1 after performing the return-to-origin operation of the actuator, the operation of supplying the awake operation start command STA to the awake timer circuit 120a, and the processing of transferring and storing data from the backup memory 113c into the nonvolatile data memory 112c. As a result, the logic levels of the operating condition signal output OUTE from the watchdog timer circuit 118 and the self-hold drive command output DR become "L", so the transistor 130 is caused nonconductive thereby to deenergize the power supply relay 104 to open the output contact 103b.

Moreover, the transistor 130 is driven by the awake timer circuit part 120a through the series circuit comprising the drive resistor 131a and the diode 131b, so that it is made conductive when the logic level of the awake output signal WUP becomes "H". Consequently, the power supply relay 104 is energized to close the output contact 103b (switching element for feeding power), whereby the control CPU 111a is activated for awakening. When the control CPU 111a is activated for awakening, the awake output signal WUP is stopped by the awake output signal stop command STP, so that the operation of the power supply relay 104 comes to be maintained, instead of the awake output signal WUP, by the self-hold drive command output DR (or the operating condition signal output OUTE generated by the watchdog timer 118 that is generated by the control CPU 111a.

Now, reference will be made to the circuit operation according to the first embodiment of the present invention as illustrated in FIG. 1 while referring to the timing charts of FIGS. 2A through 2M.

FIG. 2A shows the connection state of the on-board battery 101 to the power supply terminal SLT, wherein at a time point indicated by an upward arrow, the on-board battery 101 is put into connection to the power supply terminal SLT that has been in an interrupted state until then.

FIG. 2B shows the operating (i.e., on/off) state of the power switch 102, wherein at a time point indicated by an upward arrow, the power switch 102 is brought into a closed (turned-on) state from an opened (turned-off) state.

FIG. 2C shows the operating state of the output contact 103b of the power supply relay 104, wherein the output contact 103b is put into a closed state from an opened state (see an upward arrow) in response to the power switch 102 in FIG. 2B above being closed (see the upward arrow) or an awake output signal WUP in FIG. 2K to be described later being generated (see an upward arrow). In this connection, the output contact 103b is put into an opened state from a closed state (see a downward arrow) in response to an operating condition signal output OUTE in FIG. 2H to be described later (see a downward arrow) being stopped.

FIG. 2D shows the operating state of the control CPU 111a, wherein the control CPU 111a operates over a closed circuit period of the output contact 103b (i.e., a period from an upward arrow to a downward arrow) in FIG. 2C above.

FIG. 2E shows the initialization operation of the backup memory 113c executed by the control CPU 111a, wherein the initialization of the backup memory 113c is executed in response to the flip-flop circuit 128 in FIG. 2G to be described later being in a reset state (see an open circle).

FIG. 2F shows the logic state of the initialization completion signal FIN, wherein the logic level of the initialization completion signal FIN becomes "H" in response to the completion of initialization (falling) in FIG. 2E above.

FIG. 2G shows the logic state of the flip-flop circuit 128 (the power supply interruption monitoring memory), wherein the reset state of the flip-flop circuit 128 is fixed at a time point at which the power supply is connected (see the upward arrow) in FIG. 2A above, and it is changed into a set state in response to the generation (rising) of the initialization completion signal FIN in FIG. 2F above.

FIG. 2H shows the logic state of the operating condition signal output OUTE, wherein the control CPU 111a generates a watchdog clearing signal WD1 in response to the start of operation (rising) of the control CPU 111a in FIG. 2D above, and at this time, if the pulse period of the watchdog clearing signal WD1 is equal to or less than a prescribed value, the watchdog timer circuit 118 assumes that this indicates a normal operating state and puts the logic level of the operating condition signal output OUTE into an "H" level.

FIG. 2I shows a save operating condition, wherein at least one content of the backup memory 113c is transferred to and saved into the nonvolatile data memory 112c in response to the power switch 102 in FIG. 2B above being opened (see the downward arrow).

FIG. 2J shows the logic state of the awake operation start command STA, wherein the control CPU 111a sends awake time data TIME to the awake timer circuit part 120a in response to the termination of the save operation (falling) in FIG. 2I above, and then puts the pulse output of the awake operation start command STA into a high logic level "H". As a result, the operation of the control CPU 111a stops (falls), as shown in FIG. 2D above, and the logic level of the operating condition signal output OUTE becomes "L" (see the downward arrow), as shown in FIG. 2H above, whereby the power supply relay 104 is de-energized to open the output contact 103b (see the downward arrow), as shown in FIG. 2C above. A period Ta from the opening (see the downward arrow) of the power switch 102 of FIG. 2B above to the opening (see the downward arrow) of the output contact 103b of FIG. 2C is a self-hold period for save operation. Accordingly, when the power switch 102 is opened, the control CPU 111a stops its operation after the elapse of the save operation period Ta. On the other hand, the awake timer circuit part 120a is always or constantly fed with power from the stabilization power supply circuit 124 to continue its operation even after the power switch 102 is opened. Accordingly, the awake output signal WUP is generated, as shown in FIG. 2K, after an awake time Tb has elapsed from the generation of the awake operation start command STA in FIG. 2J above.

FIG. 2K shows the logic state of the awake output signal WUP, wherein the power supply relay 104 is energized in response to the generation (see the upward arrow) of the awake output signal WUP to close the output contact 103b (see the upward arrow), as shown in FIG. 2C above, and the operation of the control CPU 111a starts (rises), as shown in FIG. 2D above, to generate an operating condition signal output OUTE, as shown in FIG. 2H above.

FIG. 2I shows the logic state of the awake output signal stop command STP, wherein the awake output signal stop command STP is generated (rises) in response to the generation (rising) of the operating condition signal output OUTE in FIG. 2H above after the start of the awake operation, whereby the awake output signal WUP is stopped, as shown in FIG. 2K.

FIG. 2M shows the state of the awake operation, wherein the awake operation is executed in response to the start of operation (see the upward arrow) of the control CPU 111a in FIG. 2D above after the start of awaking. In addition, the control CPU 111a stops in response to the termination (falling) of the awake operation in FIG. 2M. As a result, the operating condition signal output OUTE is stopped (see the downward arrow), as shown in FIG. 2H above, whereby the power supply relay 104 is de-energized to open the output contact 103b (see the downward arrow), as shown in FIG. 2C above.

Here, note that a range Tc in which the awake output signal WUP is at a high logic level "H" in FIG. 2K above is an awake output signal generation range, and a period Td from the stoppage of the awake output signal WUP in FIG. 2K above to the opening of the output contact 103b in FIG. 2C above is a self-hold period for the awake operation period.

Now, reference will be made to the concrete operation of the control CPU 111a according to the first embodiment of the present invention as illustrated in FIG. 1 while referring to flow charts of FIGS. 3 and 4 corresponding to the timing charts of FIGS. 2A through 2M. Here, note that FIG. 4 illustrates a specific processing routine in processing steps 310b and 310c in FIG. 3.

Figure 3:
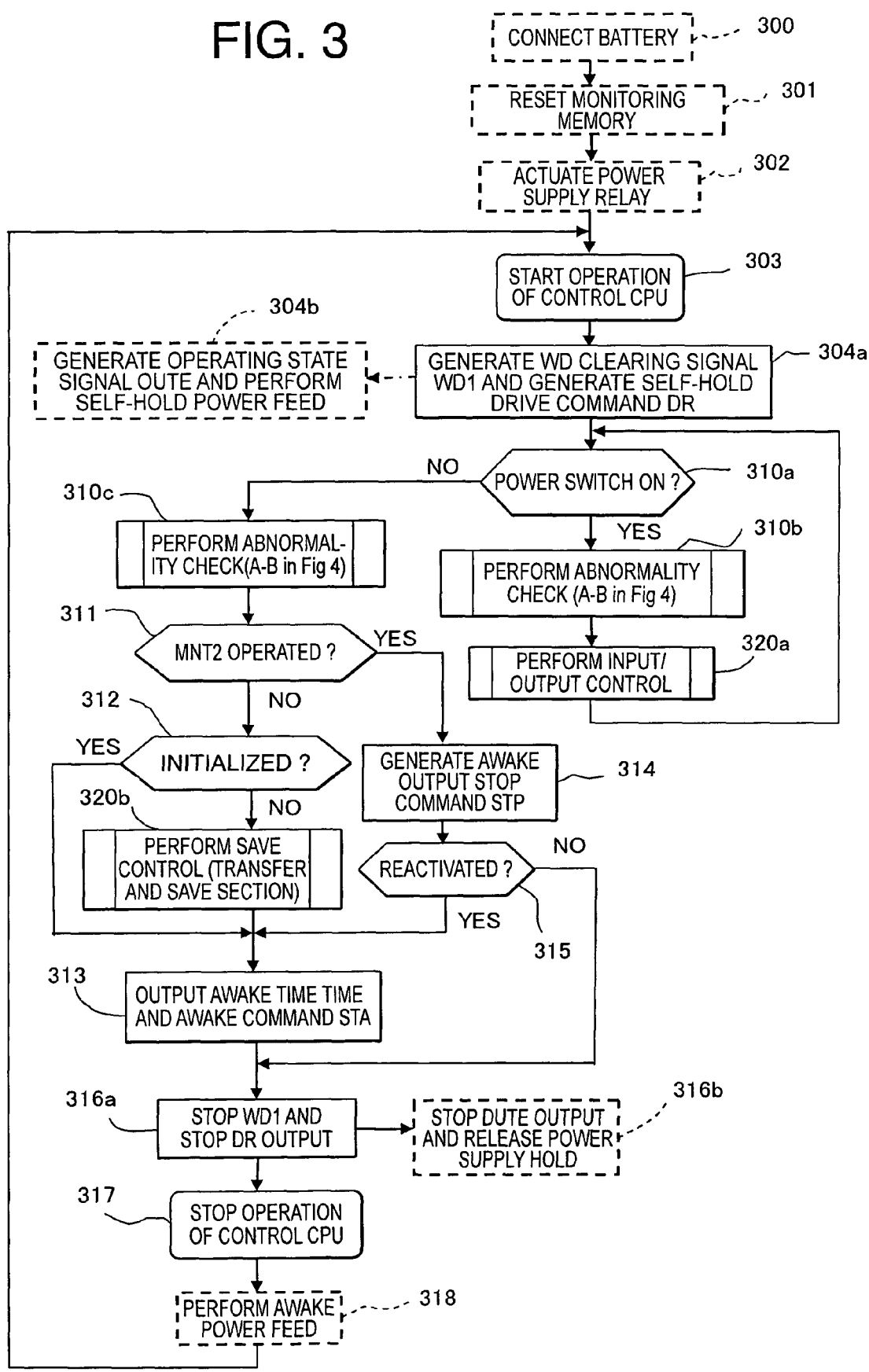
FIG. 3 is a flow chart explaining an overall operation of the vehicle-mounted electronic control apparatus according to the first embodiment of the present invention.
Figure 4:
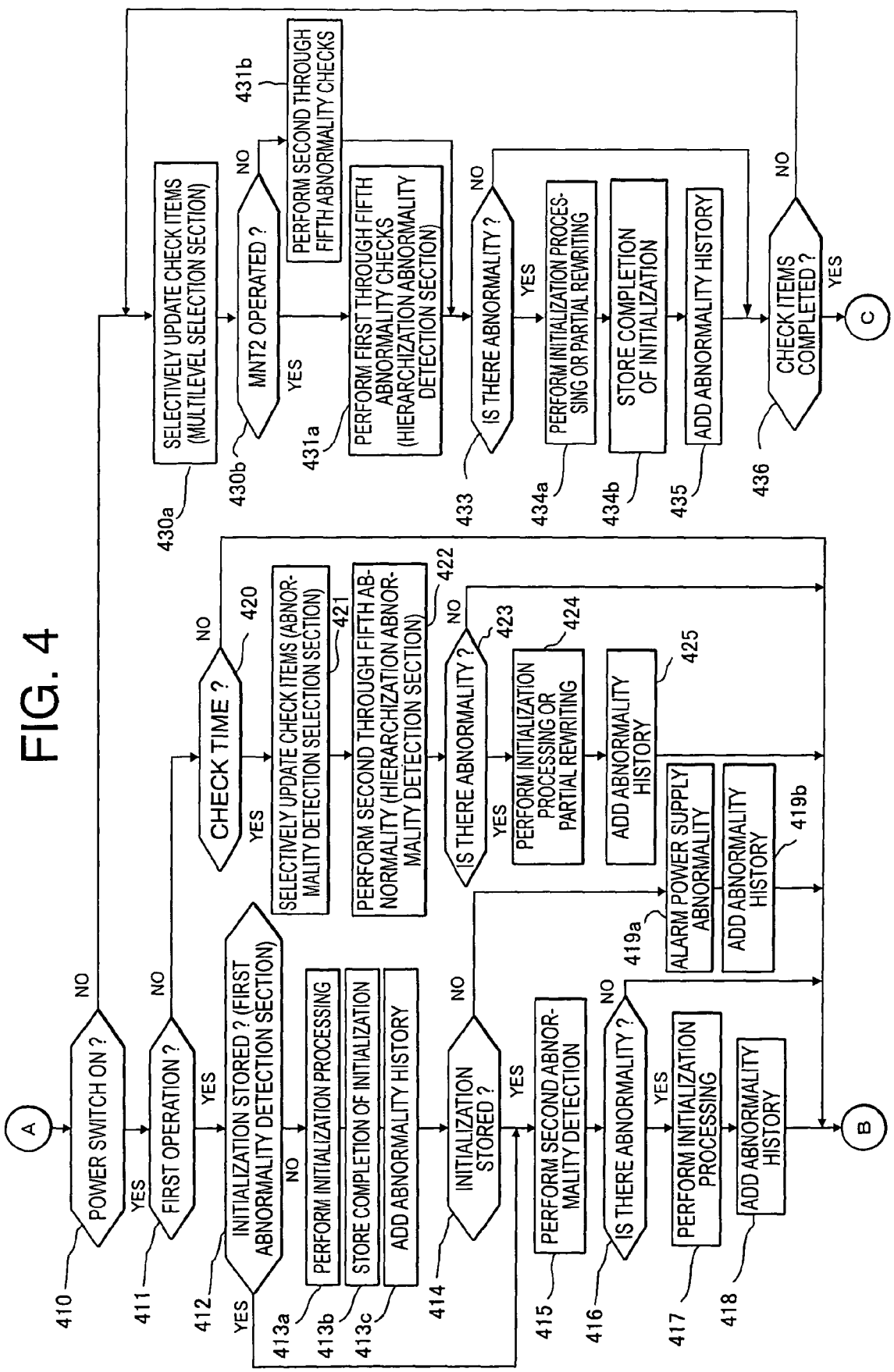
FIG. 4 is a flow chart explaining a partial operation of the vehicle-mounted electronic control apparatus according to the first embodiment of the present invention.

First of all, in FIG. 3, the vehicle-mounted electronic control apparatus 100a is connected with the on-board battery 101 as an external operation before the control CPU 111a is activated (broken line step 300).

Subsequently, the flip-flop circuit 128 serving as the power supply interruption monitoring memory is reset (broken line step 301), and when the power switch 102 will be turned on before long, the power supply relay 104 is energized to close the output contact 103b (broken line step 302). As a result, electric power is fed to the control CPU 111a, so that the control CPU 111a is started to operate (step 303), and then it generates a watchdog clearing signal WD1 and a self-hold drive signal DR (step 304a).

The watchdog timer circuit 118 generates an operating condition signal output OUTE in response to the generation of the watchdog clearing signal WD1 to maintain the conduction of the transistor 130, whereby the power supply is put into self-hold power feed state so that the electromagnetic coil 103a can be energized even if the power switch 102 is opened (broken line step 304b).

Then, the control CPU 111a monitors the inverted logic signal IGS from the interface element 134, and determines whether the power switch 102 continues to be closed (step 310a). When it is determined in step 310a that the power switch 102 is closed (turned on) (that is, YES), the control flow shifts to step 310b where a processing flow from a relay terminal A to a relay terminal B in FIG. 4 (to be described later) is executed. On the other hand, when it is determined in step 310a that the power switch 102 is opened (turned off) (that is, NO), the control flow shifts to step 310c where a processing flow from the relay terminal A to a relay terminal C in FIG. 4 (to be described later) is executed.

When the power switch 102 is closed (turned on), following the execution of the step 310b, the input output control of the electric loads 105 is executed in response to the operating state of the input sensors 106, the detection output of the analog sensor 107, and the contents of the nonvolatile control memory 112a (step 320a). After the input output control of the electric loads 105 (step 320a) is executed, a return is carried out to the successive step 310a where the control CPU 111a executes the steps 310b and 320a in a circulated manner while monitoring whether the power switch 102 is closed.

On the other hand, when the power switch 102 is opened (turned off), following executing step 310c, it is monitored whether the logic level of the awake monitor signal MNT2 from the awake timer circuit part 120a is "H" (in an operating state), and it is determined whether the awake timer circuit part 120a generates an awake output signal WUP (step 311).

When it is determined in step 311 that the logic level of the awake monitor signal MNT2 is "L" (that is, NO), it is assumed that the awake output signal WUP has not been generated, and the control flow shifts to the following determination step 312. On the other hand, when it is determined in step 311 that the logic level of the awake monitor signal MNT2 is "H" (that is, YES), it is assumed that the awake output signal WUP has been generated, and the control flow shifts to step 314. When the determination result in step 311 is "NO", the control CPU 111a determines whether the initialization of the backup memory 113c has already been executed in the preceding step 310c (see A through C in FIG. 4 for specific processing) (step 312).

When it is determined in step 312 that the backup memory 113c has not been initialized (that is, NO), important data such as various kinds of learning data, abnormality history data, etc., stored in the backup memory 113c is transferred to and saved into the nonvolatile data memory 112c (step 320b), and the control flow shift to step 313, whereas when it is determined in step 312 that the backup memory 113c has already been initialized (that is, YES), the control flow shifts to step 313 without executing the step 320b (a transfer and save section).

Thus, when the determination result in step 312 is "YES" (when abnormality is detected in the contents of the backup memory 113c, and the backup memory 113c has been initialized in step 310c) or following the save control processing (step 320b) when the determination result in step 312 is "NO", the control CPU 111a sends the next awake time data TIME to the awake timer circuit part 120a and then generates an awake operation start command STA (step 313), and the control flow shifts to step 316a.

On the other hand, when the determination result in step 311 is "YES"; the control CPU 111a generates an awake output signal stop command STP (step 314) and determines whether awake activation is to be executed again (step 315). When it is determined in step 315 that awake activation is to be executed again (that is, YES), the control flow shifts to step 313, whereas when it is determined that awake activation is not to be executed again (that is, NO), the control flow shifts to step 316a. In step 316a, the control CPU 111a stops the self-hold drive command output DR and other control outputs, and also stops the watchdog clearing signal WD1. Subsequently, the control flow shifts to the processing of shutting down the operation of the control CPU 111a (step 317). Here, note that subsequent to step 316a, the power supply relay 104 is de-energized to open the output contact 103b in response to the self-hold drive command output DR or the operating condition signal output OUTE having been stopped, and the power supply holding state is released (broken line step 316b).

Subsequent to step 317, the power supply relay 104 is energized to perform awake power feed to the control CPU 111a with the power switch 102 being opened by the awake output signal WUP (broken line step 318), and a return is carried out to the processing of starting the operation of the control CPU 111a (step 303). As a result, the control CPU 111a is reactivated.

Next, reference will be made to the specific operation of the abnormality check processing (steps 310b and 310c) in FIG. 3 while referring to FIG. 4.

In FIG. 4, step 412 corresponds to a first abnormality detection section; step 415 corresponds to a second abnormality detection section; and steps 413a and 417 correspond to the initialization section; steps 413b and 434b correspond to an initialization completion storage section; step 414 corresponds to an initialization storage verification section; step 421 corresponds to an abnormality detection selection section; steps 422, 431a and 431b correspond to a hierarchization abnormality detection section; steps 424 and 434a correspond to the initialization section (partial rewrite section); and step 430a corresponds to a multilevel selection section.

First of all, reference will be made to processing steps 410 through 425 from the relay terminal A to the relay terminal B in FIG. 4 (abnormality check step 310b in FIG. 3).

By monitoring the inverted logic signal IGS following the relay terminal A, the control CPU 111a determines whether the power switch 102 continues to be closed (turned on) (step 410). When it is determined in step 410 that the power switch 102 is closed (turned on) (that is, YES), it is subsequently determined, by referring to the operation of a first flag (not shown), whether the current processing is executed for the first time after the power switch 102 is turned on (step 411). When it is determined in step 411 that the current processing is a first operation (that is, YES), it is subsequently determined, by referring to the logic level of the initialization command signal INT in the form of a set output (S) of the flip-flop circuit 128, whether there is the storage of initialization (the logic level is "H") (step 412). The step 412 constitutes the first abnormality detection section that responds to the logic level "L" of the initialization command signal INT, and in this step, when the logic level of the initialization command signal INT is "H", it is determined that there is the storage of initialization (that is, YES), and the control flow immediately shifts to step 415 to be described later.

On the other hand, when it is determined in step 412 that the logic level of the initialization command signal INT is "L" and that there is no storage of initialization (that is, NO), the backup memory 113c is initialized (step 413a). Subsequently, an initialization completion signal FIN is generated to set the flip-flop circuit 128 so as to store the completion of initialization (step 413b). In addition, based on the determination result being "NO" in step 412 (the first abnormality detection section), the fact that the initialization processing (step 413a) has been executed is additionally written into a first address of the backup memory 113c as historical information, and the accumulated value of the number of occurrences or frequency of abnormalities is stored (step 413c).

Then, it is determined again whether the initialization command signal INT has become a high logic level "H" after the set processing of the flip-flop circuit 128 (step 413b) has been executed (step 414). When it is determined in step 414 that the initialization command signal INT has become a logic level "H" (that is, YES), the control flow shifts to step 415. The step 415 constitutes the second abnormality detection section, and in this step, assuming that the flip-flop circuit 128 has stored an initialization completion state, it is checked whether a memory at a specific address in the backup memory 113c correctly stores prescribed specific numeric data.

Thereafter, the presence or absence of an abnormality is determined in step 416 from the result of the abnormality check according to the second abnormality detection section (step 415), and when determined as the absence of an abnormality (that is, NO), the control flow shifts to the relay terminal B, and exits from the processing routine of FIG. 4.

On the other hand, when it is determined in step 416 that there is an abnormality (that is, YES), the backup memory 113c is initialized (step 417), and subsequently, it is written as historical information into a second address of the backup memory 113c that the initialization processing based on the second abnormality detection section (step 415) has been executed, and then the accumulated value of the number of occurrences of abnormalities is saved step 418), and the control flow shifts to the relay terminal B.

On the other hand, when the determination result in step 414 is "NO" and there is no storage of initialization with the logic level of the initialization command signal INT remaining "L", it is assumed that feeding electric power to the flip-flop circuit 128 is not executed due to an open-circuit of wiring extending to the power supply terminal SLT or abnormality of the stabilization power supply circuit 124, and an alarm display section (not shown) is driven to generate an alarm output (step 419a). Subsequently, the accumulated value of the number of occurrences of abnormalities is written and saved as power supply abnormality historical information into a tenth address of the backup memory 113c (step 419b), and the control flow shifts to the relay terminal B.

In addition, when the determination result in step 411 is "NO" and the current processing is not the first operation after the power switch 102 has turned on, it is determined whether it is time to execute an abnormality check of the backup memory 113c (step 420). When determined that it is not time to perform the check (that is, NO), the control flow shifts to the relay terminal B at once, and the processing routine of FIG. 4 is exited. The abnormality check time determination processing (step 420) is repeatedly carried out after the power switch 102 is turned on.

On the other hand, when determined in step 420 that it is the time to perform an abnormality check of the backup memory 113c (that is, YES), one of the second through fifth check item numbers is sequentially determined (step 421: the abnormality detection selection section), and an abnormality detection section for the thus selected item number is executed (step 422: the hierarchization abnormality detection section). Thereafter, the presence or absence of an abnormality is determined in step 423 from the result of the abnormality check in step 422, and when determined as the absence of an abnormality (that is, NO), the control flow immediately shifts to the relay terminal B, whereas when determined in step 423 as the presence of an abnormality (that is, YES), the initialization or partial rewriting of the backup memory 113c (to be described later) is carried out (step 427). Subsequently, it is written as historical information into a n-th address of the backup memory 113c that the initialization processing based on an n-th abnormality detection section (step 415) has been executed, and then the accumulated value of the number of occurrences of abnormalities is saved (step 425), and the control flow shifts to the relay terminal B. The above steps 410 through 425 constitute the specific processing operation in step 310b in FIG. 3, and step 320a in FIG. 3 is executed following the relay terminal B.

Next, reference will be made to processing steps 430a through 436 from the relay terminal A to the relay terminal C in FIG. 4 (abnormality check step 310c in FIG. 3).

When it is determined in the above step 410 that the power switch 102 is in an opened (turned-off) state (that is, NO), the control CPU 111a selectively updates the check item by means of the multilevel selection section (step 430a). Subsequently, the logic level of the awake monitor signal MNT2 is monitored to determine whether it is under an awake operation (the logic level is "H") (step 430b). When it is determined in step 430b that the logic level of the awake monitor signal MNT2 is "H" and it is under an awake operation (that is, YES), the control flow shifts to step 431a, whereas when it is determined in step 430b that the logic level of the awake monitor signal MNT2 is "L" and it is not under an awake operation (that is, NO), it is assumed that it is in a save operation immediately after the power switch 102 is opened, and the control flow shifts to step 431b. The steps 431a and 431b constitute the hierarchization abnormality detection section which sequentially selects and determines one of the first through fifth check item numbers in step 431a or one of the second through fifth check item numbers in step 431b. As a result, an abnormality detection section for the item number selected in step 431*a* or 431*b* is executed or activated.

Then, the presence or absence of an abnormality is determined from the result of the abnormality check according to step 431*a* or 431*b* (step 433), and when determined as the absence of an abnormality (that is, NO), the control flow shifts to step 436, whereas when determined as the presence of an abnormality (that is, YES), the control flow shifts to step 434*a*. When it is determined in step 433 as the presence of an abnormality (that is, YES), the control CPU 111*a* performs the initialization or partial rewriting of the backup memory 113*c* (to be described later) (step 434*a*).

Subsequently, only when the first abnormality detection section is executed in step 431*a* (the hierarchization abnormality detection section), an initialization completion signal FIN is sent to the flip-flop circuit 128 (step 434*b*). Also, it is written as historical information into the n-th address of the backup memory 113*c* that the initialization processing based on the n-th abnormality detection section has been executed, and the accumulated value of the number of occurrences of abnormalities is saved (step 435), and the control flow shifts to step 436.

In step 436, the control CPU 111*a* determines whether the selective update of the check item in step 430*a* has been completed, and when it is determined that the check item is not completed (that is, NO), the control flow returns to step 430*a*. Here, note that after the return to step 430*a*, the determination according to step 430*b* depends on the first determination result, and once the operation determination of the awake monitor signal MNT2 is executed (that is, YES), the step 430*a* and steps 431*a* through step 436 are repeatedly executed. On the other hand, when it is determined in step 436 that the check item has been completed (that is, YES), the control flow shifts to the relay terminal C, and the processing routine of FIG. 4 is exited. The above steps 430*a* through 436 constitute the specific processing operation in step 310*c* in FIG. 3, and step 311 in FIG. 3 is executed following the relay terminal C.

Hereinafter, a supplementary explanation will be given to the entire control flows illustrated in FIG. 3 and FIG. 4.

The step 320*b* in FIG. 3 (the transfer and save section) is executed in an "engine stop state" in which the power switch 102 is changed from "turned on" to "turned off" so that a self-hold power feed operation by the power supply relay 104 is carried out.

In step 320*b*, "learning correction data" stored in a first area of the backup memory 113*c* according to learning items is transferred to and stored into a first area of the nonvolatile data memory 112*c*, and "abnormality occurrence frequency data" stored in a second area of the backup memory 113*c* according to abnormal code numbers is transferred to and stored into a second area of the nonvolatile data memory 112*c*. The transfer and save processing at this time is avoided from being executed by the initialization determination step 312 when the backup memory 113*c* has been initialized in the abnormality check step 310*c*.

In the initialization steps 413*a*, 417, 424 and 434*a* in FIG. 4, the contents in the first and second areas of the nonvolatile data memory 112*c* are read out, transferred to and written into the first and second areas of the backup memory 113*c*, and specific numeric data is written into remaining specific addresses, and reset processing is performed with respect to the other addresses of the backup memory 113*c*.

In steps 422, 431*a* and 431*b* (the hierarchization abnormality detection section), the first abnormality detection section (step 412) constitutes a check section that makes, in response to the flip-flop circuit 128 (the power supply interruption monitoring memory) not storing a set state, a determination that the stored information of the backup memory 113*c* has been lost, too. In addition, the second abnormality detection section (step 415) constitutes a check section that checks whether a memory at a specific address in the backup memory 113*c* correctly stores prescribed specific numerical data. A check section, which checks the presence or absence of missing or mixing of bit information in the entire backup memory 113*c* through a sum check, constitutes a third abnormality detection section. A check section, which checks whether the values in the backup memory 113*c* exceed a permitted correction variation range by making a comparison between the contents of the backup memory 113*c* and data related to the permitted correction variation range stored in the nonvolatile control memory 112*a*, constitutes a fourth abnormality detection section. Further, a check section, which additionally stores beforehand inverted logic data with respect to the positive logic data stored in the backup memory 113*c* and checks whether the inverted logic data and the positive logic data are mutually in an inverted logical relation at the time of abnormality check, constitutes a fifth abnormality detection section.

In the initialization processing (partial rewriting) steps 424, 434*a*, when an abnormality detection section executed in steps 422, 431*a* or 431*b* (the hierarchization abnormality detection section) determines, according to the fourth or fifth abnormality detection section, that a data memory content at a specific address is abnormal, "partial rewriting" to initialize only the data memory content at the abnormal address is executed.

Although in step 421 (the abnormality detection selection section), the abnormality check item numbers are updated sequentially, there is a "waiting time" generated between the current abnormality check and the following abnormality check due to the check time determination step 420, so the update can be sequentially performed while the operation of the input output control step 320*a* in FIG. 3 is carried out.

On the other hand, though in step 430*a* (the multilevel selection section), the abnormality check item numbers are sequentially updated, there is no update waiting time generated in this case, so each time one abnormality check is executed, an abnormality check of the following item is continuously carried out.

In the third abnormality detection section (sum check), it can be changed in such a manner that the backup memory 113*c* is divided into a plurality of groups, and a sum check is carried out sequentially according to each unit of division.

Moreover, as the section for checking the presence or absence of missing or mixing of bit information, by focusing attention to a remainder obtained by dividing the sum of all the pieces of data by a predetermined constant, there can be used, beside the check sum section, another method such as one for determining through comparison whether a remainder calculated at a check time point and a remainder calculated beforehand are equal to each other.

As described above, the vehicle-mounted electronic control apparatus 100*a* according to the first embodiment of the present invention (see FIG. 1) includes the main power supply circuit 114*a* which is supplied with electric power from the on-board battery 101 to generate a first stabilized control voltage upon closure of the power supply switch 102, the control CPU 111*a* (microprocessor) to which electric power is fed by the main power supply circuit 114*a*, the auxiliary power supply circuit 114*b* which is directly fed with electric power from the on-board battery 101 to generate a second stabilized control voltage without passing through the power supply switch 102, and the volatile backup memory 113*c* which is constantly fed with electric power through the auxiliary power supply circuit 114b or the main power supply circuit 114a to store learning correction data for the reference control constants stored in the nonvolatile control memory 112a. The control CPU 111a controls the electric loads 105 based on the contents of the nonvolatile control memory 112a in which the control program and the reference control constants are written and the operating states of the input sensors 106 and the analog input sensor 107.

The vehicle-mounted electronic control apparatus 100a further includes the power supply turn-on detection section (Schmitt circuit 125) of the auxiliary power supply circuit 114b, the initialization section (step 413a) for the backup memory 113c, the initialization completion storage section (step 413b), the hierarchization abnormality detection section (step 422) for the backup memory 113c, and the abnormality detection selection section (step 421).

The power supply turn-on detection section (Schmitt circuit 125) in the vehicle-mounted electronic control apparatus 100a stores the existence of the power supply interrupted state by putting the contents of the power supply interruption monitoring memory (flip-flop circuit 128) into a reset state in response to the auxiliary power supply circuit 114b having been connected to the on-board battery 101.

The initialization completion storage section (step 413b) rewrites and changes the contents of the power supply interruption monitoring memory 128 into a set state in response to the control CPU 111a having completed the initialization of the backup memory 113c.

In addition, the initialization completion storage section (step 413b) includes the initialization storage verification section (step 414) which verifies whether rewriting and changing has been executed, or the voltage monitoring section (voltage monitoring signal MNT1) which monitors whether feeding electric power to the power supply interruption monitoring memory (flip-flop circuit 128) is executed.

The initialization section (step 413a) initializes the contents of the backup memory 113c by means of the control CPU 11a in response to when electric power is fed from the main power supply circuit 114a to the control CPU 11a and when the contents of the power supply interruption monitoring memory (flip-flop circuit 128) has not stored a set state.

The hierarchization abnormality detection section (step 422) constitutes a variety of kinds of abnormality detection sections which are executed by the control CPU 111a to determine whether there is an abnormality in the memory contents of the backup memory 113c, and to initialize the backup memory 113c when an abnormality is detected.

The abnormality detection selection section (step 421) executes a part of the abnormality detection sections in the hierarchization abnormality detection section 422 immediately after the power switch 102 is turned on, and omits execution of the other abnormality detection sections even when an abnormality has not been detected in the execution result. Also, the abnormality detection selection section (step 421) sequentially and repeatedly executes at least one of the other abnormality detection sections during operation of the control CPU 111a.

Further, according to the first embodiment of the present invention, the power supply turn-on detection section (Schmitt circuit 125) resets the contents of the power supply interruption monitoring memory (flip-flop circuit 128) by detecting when the input voltage or the output voltage of the auxiliary power supply circuit 114b has risen from the first voltage V1 (first threshold) or below to the second voltage V2 (second threshold) or above. Here, note that the storage operation of the backup memory 113c continues when the input voltage or the output voltage of the auxiliary power supply circuit 114 is equal to or higher than a value corresponding to the first threshold. Accordingly, the contents of the power supply interruption monitoring memory (flip-flop circuit 128) is never reset carelessly even if the power supply voltage increases and decreases above or below the first threshold (first voltage V1), thus making it possible to avoid unnecessary initialization.

Moreover, according to the first embodiment of the present invention, the hierarchization abnormality detection section (step 422) is provided with at least one of the first through third abnormality detection sections, and the first abnormality detection section (step 412) constitutes a check section that makes, in response to the power supply interruption monitoring memory (flip-flop circuit 128) not storing a set state, a determination that the stored information of the backup memory 113c has been lost, too. The second abnormality detection section (step 415) checks whether a memory at a specific address in the backup memory 113c correctly stores prescribed specific numerical data. The third abnormality detection section (sum check) checks the presence or absence of the missing or mixing of bit information by performing a sum check on the entire backup memory 113c, and at least the first abnormality detection section is selectively executed immediately after the power switch 102 has been turned on.

Accordingly, at the start of operation, the first and second abnormality detection sections are executed for instance, and during operation, the second and third abnormality detection sections are repeatedly executed in a sequential manner, so that a change or loss in the data of the backup memory 113c resulting from abnormal reduction of the power supply voltage, excessively large noise or the like can be efficiently detected.

Further, the vehicle-mounted electronic control apparatus 100a according to the first embodiment of the present invention is provided with the interface element 134 of the engine state detection section, the awake timer circuit part 120a, and the multilevel selection section (step 430a) for the abnormality detection sections. The awake timer circuit part 120a is constantly fed with electric power from the on-board battery 101 through the stabilization power supply circuit 124, which generates a predetermined stabilized voltage, so that it measures the time during which the main power supply circuit 114a has been interrupted, and awakes and activates the control CPU 11a in the stopped state of the engine by generating an awake output signal WUP thereby to connect the main power supply circuit 114a to the on-board battery 101 when the time measured reaches a predetermined target awake time.

The multilevel selection section (step 430a) intensively or concentratedly executes a plurality of abnormality detection sections in the hierarchization abnormality detection section (step 431a) in response to when the control CPU 111a executes an awake operation in the stopped state of the engine, and initializes the backup memory 113c when abnormality is detected. Accordingly, the contents of the backup memory 113c are checked in detail when the vehicle is parked for instance, and they are initialized beforehand if an abnormality occurs during the parking of the vehicle, so that the engine can be started by performing a simple abnormality check at a busy time when one starts to drive the vehicle.

Furthermore, according to the first embodiment of the present invention, the hierarchization abnormality detection section (steps 422, 431a and 431b) includes at least one of the fourth and fifth abnormality detection sections, and the initialization section includes the partial rewrite section (steps 424 and 434a). The fourth abnormality detection section checks whether the values in the backup memory 113c exceed the permitted correction variation range by making a comparison between the contents of the backup memory 113c and data related to the permitted correction variation range stored in the nonvolatile control memory 112a. The fifth abnormality detection section additionally stores beforehand the inverted logic data to the positive logic data stored in the backup memory 113c, and checks whether the inverted logic data and the positive logic data are mutually in an inverted logical relation at the time of abnormality check. When it is determined by the fourth or fifth abnormality detection section that the content at a specific address of the backup memory 113c is abnormal, the partial rewrite section (step 424 and 434a) initializes the content at the abnormal address of the backup memory 113c. Accordingly, only abnormal pieces of data can be individually initialized by increasing abnormality check items such as those immediately before the stop of operation, during parking, immediately before the start of operation, during operation except for the state immediately after the start of operation, etc., and by performing a more specific abnormality check.

In addition, according to the first embodiment of the present invention, the main power supply circuit 114a is fed with electric power from the on-board battery 101 through the output contact 103b of the power supply relay 104 that is energized through the power switch 102, and the power supply relay 104 performs self-hold operation in response to the operation of the control CPU 111a so that it continues feeding power even when the power switch 102 is opened, and it is de-energized in response to the stop of the operating condition signal output OUTE or the self-hold drive command output DR of the control CPU 111a. Also, the main power supply circuit 114a is provided with the transfer and save section 320b that is executed during the self-hold operation of the power supply relay 104, and the nonvolatile data memory 112c that is a save destination. The transfer and save section 320b serves to transfer and save the learning correction data, which is stored in the first area of the backup memory 113c according to learning items into the first area of the nonvolatile data memory 112c, and also transfer and save the abnormality occurrence frequency data, which is stored in the second area of the backup memory 113c according to abnormal code numbers, into the second area of the nonvolatile data memory 112c. The initialization section (steps 413a, 424 and 434a) reads out the contents in the first and second areas of the nonvolatile data memory 112c, transfers and writes them into the first and second areas of the backup memory 113c, writes specific numeric data into remaining specific addresses, and performs reset processing with respect to the other addresses of the backup memory 113c. Accordingly, immediately after the stop of the operation, the contents of the backup memory 113c are transferred and stored into the nonvolatile data memory 112c so as to reduce the load of the control CPU 111a and save a multitude of pieces of data quickly, so that they can be reused when an abnormality occurs in the contents of the backup memory 113c. In addition, the capacity of the nonvolatile data memory 112c can be reduced, and initialization processing can be simplified.

Moreover, according to the first embodiment of the present invention, provision is made for the multilevel selection section (step 430a) for the abnormality detection sections, and the multilevel selection section (step 430a) intensively executes a plurality of abnormality detection sections in the hierarchization abnormality detection section (step 431b) in response to when self-hold power feed is executed due to the opening of the power switch 102, and initializes the backup memory 113c when an abnormality is detected. Accordingly, the contents of the backup memory 113c are checked in detail immediately after the operation of the vehicle is stopped, and they are initialized if an abnormality occurs during the operation of the vehicle, so that the engine can be started by performing a simple abnormality check at the busy time of starting the operation of the vehicle.

Further, according to the first embodiment of the present invention, the main power supply circuit 114a is connected to the on-board battery 101 through the power feed switching element (the output contact 103b) that responds to an awake output signal WUP from the awake timer circuit part 120a. Thus, the control CPU 111a is awaked and activated in response to power being fed thereto. The power feed switching element is constituted by the output contact 103b of the power supply relay 104 that serves to feed power to the electric loads 105. The awake output signal WUP is stopped in response to the activation of the control CPU 111a, and the self-hold operation of the power feed switching element 103b is executed by the control CPU 111a, and the power feed switching element 103b is opened in response to the stop of the operating condition signal output OUTE or the self-hold drive command output DR of the control CPU 111a. Accordingly, the time required for the awake operation is determined by the control CPU 111a, so the awake timer circuit part 120a is prevented from generating the awake output signal WUP for an extended period of time unnecessarily, thereby making it possible to reduce the power consumption of the on-board battery 101.

Embodiment 2

Figure 5:
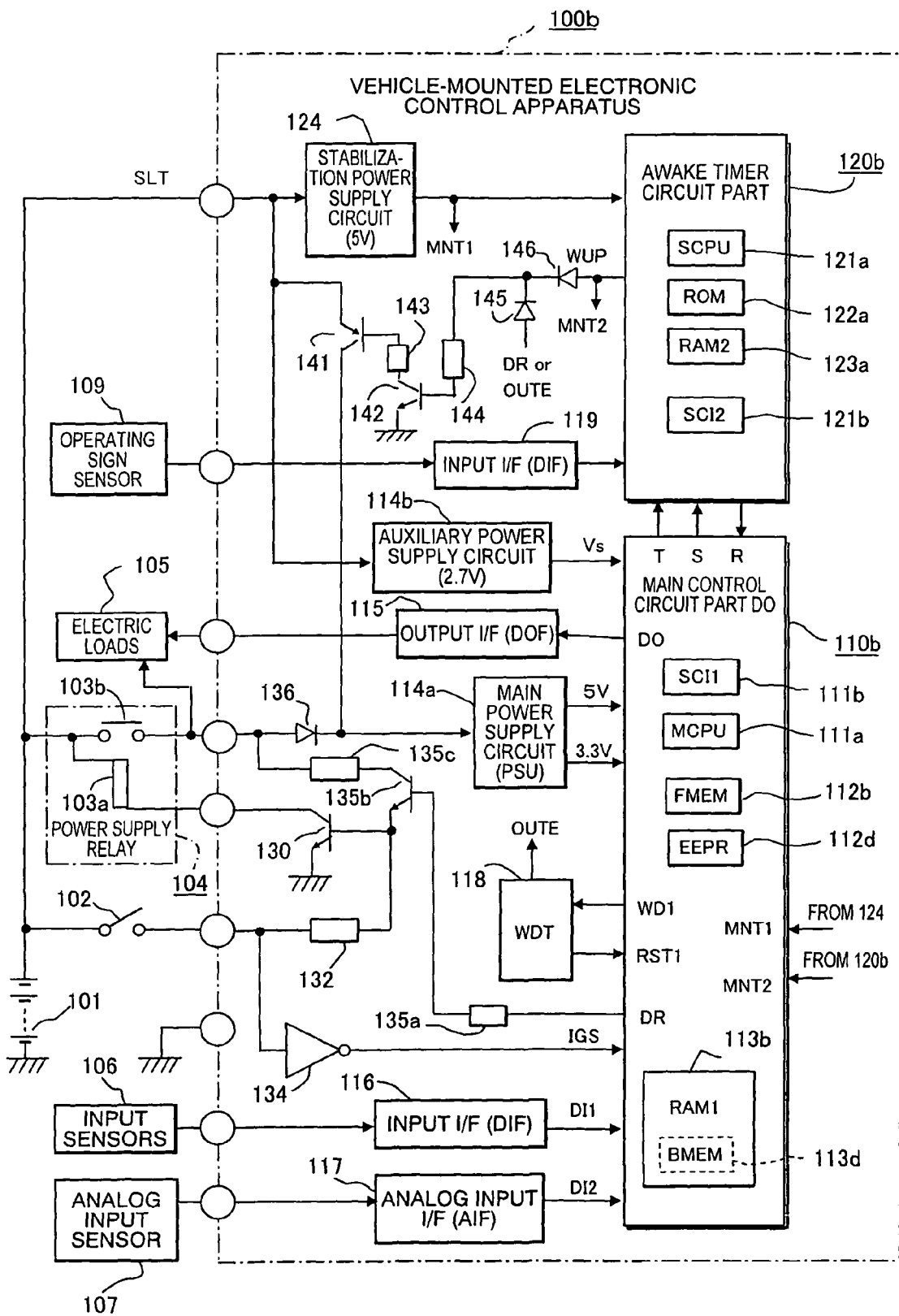
FIG. 5 is a block diagram showing the overall circuit configuration of a vehicle-mounted electronic control apparatus according to a second embodiment of the present invention.

Although the additional control circuit part 140 is provided in the above-mentioned first embodiment (see FIG. 1), provision can be made for an operating sign sensor 109, a power feed transistor 141, etc., related to the awake timer circuit part 120b, as shown in FIG. 5, while omitting a part of the additional control circuit part 140.

Hereinafter, a second embodiment of the present invention will be described while referring to FIG. 5. FIG. 5 is a block diagram that shows the overall circuit configuration of a vehicle-mounted electronic control apparatus according to the second embodiment of the present invention. In FIG. 5, the same parts or components as those described above (see FIG. 1) are identified by the same symbols or by the same symbols with "b" affixed to their ends, while omitting a detailed explanation thereof.

In this case, a vehicle-mounted electronic control apparatus 100b is mainly composed of a main control circuit part 110b to which electric power is fed from a main power supply circuit 114a and an auxiliary power supply circuit 114b, and an awake timer circuit part 120b to which electric power is fed from a stabilization power supply circuit 124, and is housed in an unillustrated sealed casing. The main control circuit part 110b includes, in conjunction with the awake timer circuit part 120b, a power feed transistor 141, a transistor 142, drive resistors 143, 144, diodes 145, 146, and an input interface circuit 119. Also, the main control circuit part 110b further includes, in conjunction with the main control circuit part 110b, a base resistor 135a, a transistor 135b, a drive resistor 135c, and a back flow preventing diode 136.

The operating sign sensor 109 such as a key sensor, a door sensor, etc., is connected to the input interface circuit 119 of the awake timer circuit part 120b. The output contact 103b of the power supply relay 104 having the electromagnetic coil 103a is connected to the main power supply circuit 114a through the back flow preventing diode 136, and constitutes a first feeder circuit from the on-board battery 101. The power feed transistor 141 becomes a power feed switching element that constitutes a second feeder circuit.

The main control circuit part 110b is composed of a control CPU 111a, a series/parallel converter (SCI1) 111b, a nonvolatile control memory (FMEM) 112b such as a nonvolatile flash memory, a nonvolatile data memory 112d such as a EEPROM memory, and a backup memory (BMEM) 113d contained in the RAM memory 113b for arithmetic processing. The main control circuit section 110b generates a watchdog clearing signal WD1 and a self-hold drive signal DR in response to the start of operation of the control CPU 111a. The transistor 130 for energizing the electromagnetic coil 103a is driven into conduction in response to the closing of the power switch 102. In addition, during the operation of the control CPU 111a, the transistor 135b is driven into conduction by the self-hold drive signal DR through the base resistor 135a, so that the transistor 130 is held conductive by means of the drive resistor 135c and the transistor 135b.

The awake timer circuit part 120b is composed of an awake CPU 121a of low speed and low power consumption, a series/parallel converter 121b, a nonvolatile awake memory 122a such as a mask ROM, and a RAM memory 123a, and when a predetermined target awake time has elapsed after the opening of the output contact 103b (first feeder circuit), the awake timer circuit part 120b generates an awake output signal WUP. Here, note that the control CPU 111a and the awake CPU 121a are arranged so as to perform serial communications with each other through series/parallel converters 111b, 121b of paired configuration.

On the other hand, the operating sign sensor 109 is connected to an input port of the awake CPU 121a through the input interface circuit 119. The output voltage of the stabilization power supply circuit 124 is input to the control CPU 111a as a voltage monitoring signal MNT1, and the awake output signal WUP is also connected to the monitor input terminal MNT2 of the control CPU 111a as an awake monitor signal MNT2.

The power feed transistor 141 (second feeder circuit) is connected between the on-board battery 101 and the main power supply circuit 114a, so that when the transistor 142 arranged in the base circuit of the power feed transistor 141 is made conductive, the power feed transistor 141 is driven into conduction through the drive resistor 143. The transistor 142 is driven into conduction by the awake output signal WUP from the output terminal of the awake timer circuit part 120b through a series circuit comprising the diode 146 and the drive resistor 144, and at the same time it is held conductive by the self-hold drive output DR of the control CPU 111a through a series circuit comprising the diode 145 and the drive resistor 144. Here, note that the operating condition signal output OUTE, which is generated by the watchdog timer circuit 118 at the time when the pulse width of the watchdog clearing signal WD1 (pulse train) is less than or equal to a predetermined value, can be used in place of the self-hold drive output DR that holds the transistors 135b, 142 conductive.

In addition, if the awake CPU 121a operates to continue generating the awake output signal WUP and the generation thereof is made to stop by the control CPU 111a in response to the termination of the awake operation, the transistor 142 need not be driven by the self-hold drive signal DR or the operating condition signal output OUTE.

As shown in FIG. 5, the vehicle-mounted electronic control apparatus 100b is provided with the interface element 134 that constitutes the engine state detection section for detecting the operating/stopped state of the engine, the awake timer circuit part 120b comprising the awake CPU 121a including the nonvolatile awake memory 122a and the RAM memory 123a, and the main control circuit part 110b comprising the control CPU 111a including the backup memory 113d.

The awake timer circuit part 120b is provided with an initialization reset section for the RAM memory 123a, and the main control circuit part 110b is provided with an initialization section for the backup memory 113d, an initialization completion storage section that stores the initialization completion state of the initialization section, a hierarchization abnormality detection section for the backup memory 113d, and an abnormality detection selection section that selects the execution of abnormality detection according to the hierarchization abnormality detection section. The awake timer circuit part 120b is constantly fed with electric power from the on-board battery 101 through the stabilization power supply circuit 124, which generates a predetermined stabilized voltage, so that it measures the time during which the main power supply circuit 114a has been interrupted, and awakes and activates the control CPU 111a in the stopped state of the engine by generating an awake output signal WUP thereby to connect the main power supply circuit 114a to the on-board battery 101 when the time measured reaches a predetermined target awake time.

The awake CPU 121a is activated in response to when the output voltage of the stabilization power supply circuit 124 becomes equal to or more than a predetermined value, and the initialization reset section resets the contents of the RAM memory 123a at the time when the awake CPU 121a is activated.

The initialization completion storage section in main control circuit part 110b writes and saves the fact that the awake CPU 121a is in an initialization completion state with respect to a specific address of the RAM memory 113b, based on an initialization completion signal (corresponding to the FIN in FIG. 2) which is transmitted through serial communication from the control CPU 111a in response to the completion of initialization of the backup memory 113d by the control CPU 111a.

In addition, the initialization completion storage section includes an initialization storage verification section or a voltage monitoring section, and the initialization storage verification section verifies whether the rewriting and changing of the RAM memory 113b is executed, and the voltage monitoring section monitors whether feeding power to the RAM memory 113b is executed.

The initialization section in the main control circuit section 110b initializes the backup memory 113d by means of the control CPU 111a in response to when electric power is fed from the main power supply circuit 114a to the control CPU 111a and when the specific address of the RAM memory has not stored the initialization completion state.

The hierarchization abnormality detection section in main control circuit part 110b comprises a plurality of abnormality detection sections executed by the control CPU 110b, determines whether there is an abnormality in the memory contents of the backup memory 113d, and initializes the backup memory 113d when an abnormality is detected in the memory contents of the backup memory 113d.

The abnormality detection selection section in the main control circuit part 110b executes a part of the abnormality detection sections in the hierarchization abnormality detection section immediately after the power switch 102 is turned on, omits the execution of the other abnormality detection sections in the hierarchization abnormality detection section even when no abnormality has been detected in the execution result, and sequentially executes at least one of the other abnormality detection sections in a repeated manner.

Figure 6:
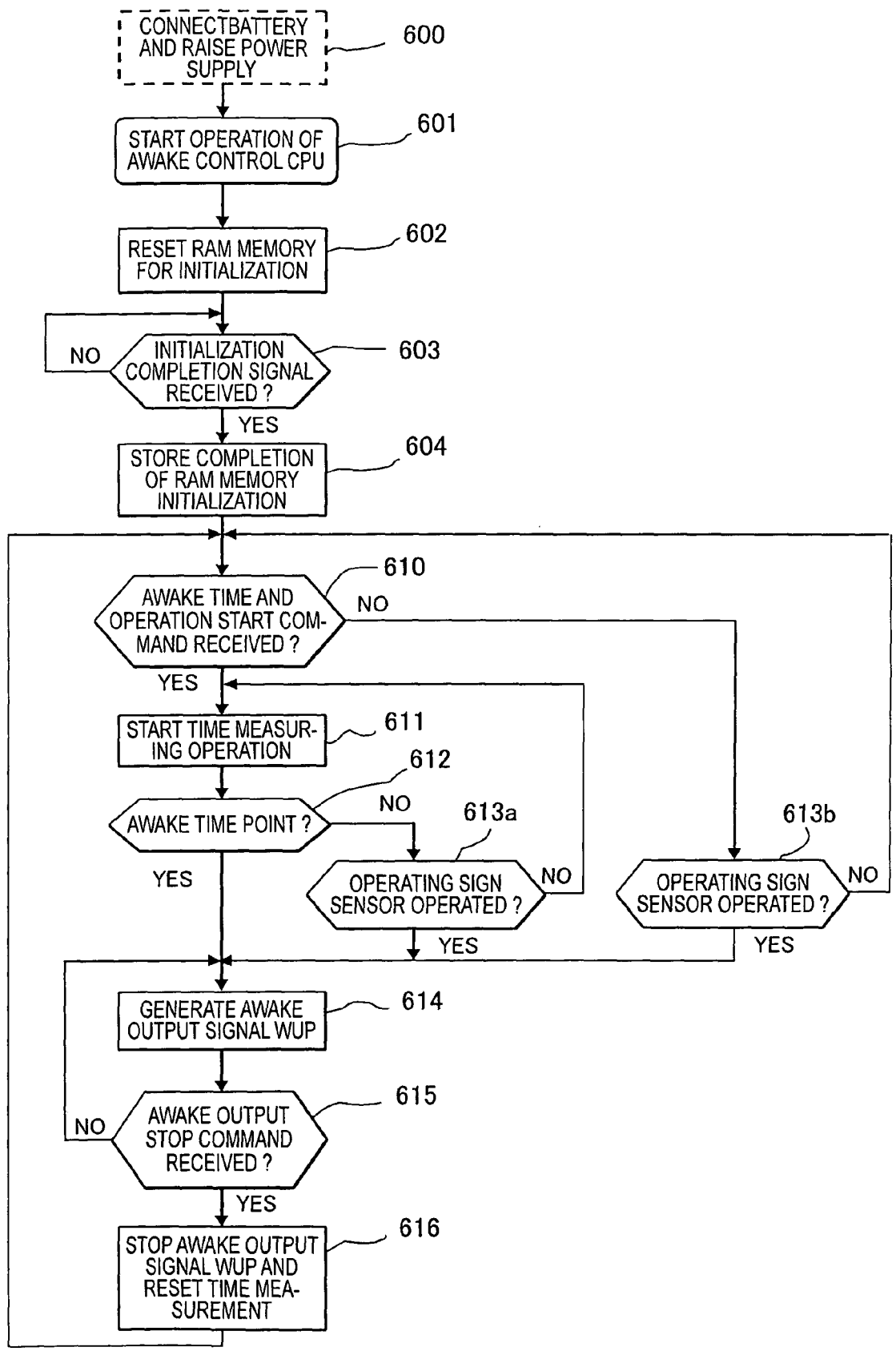
FIG. 6 is a flow chart explaining the operation of an awake timer circuit part according to the second embodiment of the present invention.

Now, a specific processing operation according to the second embodiment of the present invention as illustrated in FIG. 5 will be described while referring to FIG. 6. FIG. 6 is a flow chart that illustrates the control processing executed by the awake CPU 121a in cooperation with the nonvolatile awake memory 122a.

In FIG. 6, first of all, when the on-board battery 101 is connected to the power supply terminal SLT, the power supply rises (broken line step 600) and the awake CPU 121a starts to operate in response to this (step 601). Subsequently, all the contents of the RAM memory 123a are initialized and reset (step 602), and it is determined whether an initialization completion signal (corresponding to the FIN in FIG. 2) has been received through serial communication from the control CPU 111a, and waits for reception of the initialization completion signal (step 603).

When it is determined in step 603 that the initialization completion information has been received (that is, YES) and the initialization of the control CPU 111a has been completed, initialization completion information sent from the control CPU 111a is transferred to and written into a predetermined address of the RAM memory 123a (step 604). The purpose of the processing operation according to the above-mentioned steps 602 through 604 is the same as the above-mentioned series of operations from the resetting to setting of the flip-flop circuit 128 (see FIG. 1). In other words, in the steps 602 through 604 in FIG. 6, a memory at the specific address in the RAM memory 123a is used in place of the above-mentioned flip-flop circuit 128.

Then, it is determined whether awake time data TIME and an awake operation start command STA have been received from the control CPU 111a (step 610), and when it is determined as having been received (that is, YES), a time measuring operation is started (step 611), and it is determined whether a commanded awake time has elapsed and an awake time point has been reached (step 612). When it is determined in step 612 that an awake time point has been reached (that is, YES), the control flow shifts to step 614, whereas when it is determined that an awake time point has not been reached (that is, NO), it is subsequently determined whether the operating sign sensor 109 has been operated (step 613a). When determined in step 613a that the operating sign sensor 109 has been operated (that is, YES), the control flow shifts to step 614, whereas when determined that the operating sign sensor 109 has not been operated (that is, NO), the control flow returns to step 611 where the time measuring operation is continued.

On the other hand, when it is determined in step 610 that the awake time data TIME and the awake operation start command STA have not been received (that is, NO), it is subsequently determined whether the operating sign sensor 109 has been operated when the awake operation start command STA has not been received (step 613b). When it is determined in step 613b that the operating sign sensor 109 has been operated (that is, YES), the control flow shifts to step 614, whereas when it is determined that the operating sign sensor 109 has not been operated (that is, NO), the control flow returns to step 610 where the reception of an awake operation start command STA is awaited. When the determination results of the above steps 612, 613a and 613b are "YES", an awake output signal WUP is generated (step 614), and it is determined whether an awake output signal stop command STP has been received from the control CPU 111a (step 615).

When it is determined in step 615 that an awake output signal stop command STP has not been received (that is, NO), a return is performed to step 614 where the awake output signal WUP continues to be generated, whereas when it is determined in step 615 that an awake output signal stop command STP has been received (that is, YES), the generation of the awake output signal WUP is stopped, and the current value of a timing counter is reset (step 616), and a return to step 610 is carried out.

Here, note that the above determination step 602 corresponds to the function of an initialization reset section with respect to the RAM memory 123a in the awake timer circuit part 120b. In addition, step 604 corresponds to the function of the initialization completion storage section in the main control circuit part 110b, and step 614 corresponds to the function of an awake output signal generation section in the main control circuit part 110b.

Now, reference will be made to the operation of the control CPU 111a according to the second embodiment of the present invention as illustrated in FIG. 5 while referring to flow charts of FIGS. 7 and 8. Here, note that steps 703 through 718 in FIG. 7 are the same processes as those in the above-mentioned steps 303 through 318 (see FIG. 3), and steps 810 through 836 in FIG. 8 are the same processes as those in the above-mentioned steps 410 through 436 (see FIG. 4).

Figure 7:
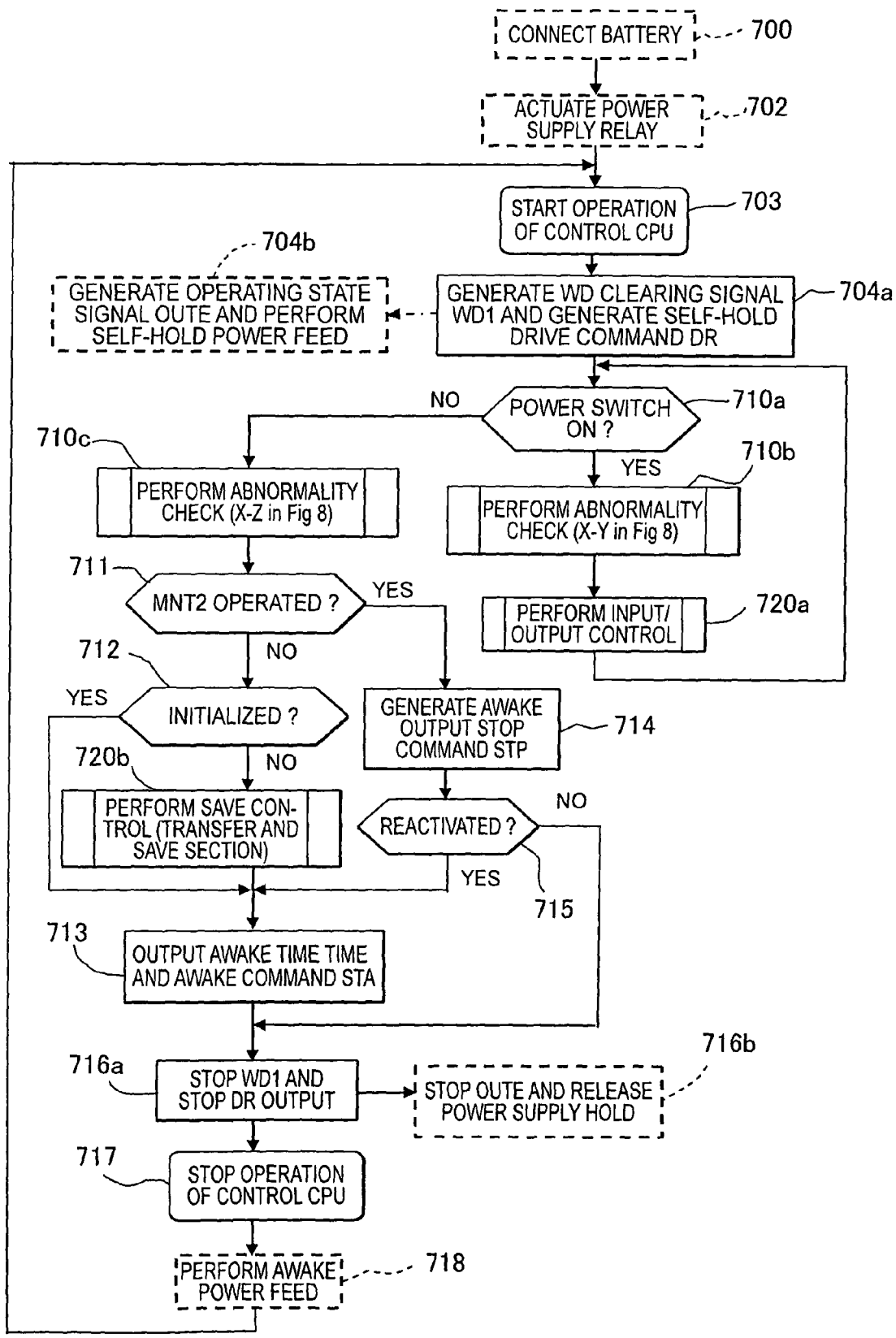
FIG. 7 is a flow chart explaining an overall operation of the vehicle-mounted electronic control apparatus according to the second embodiment of the present invention.
Figure 8:
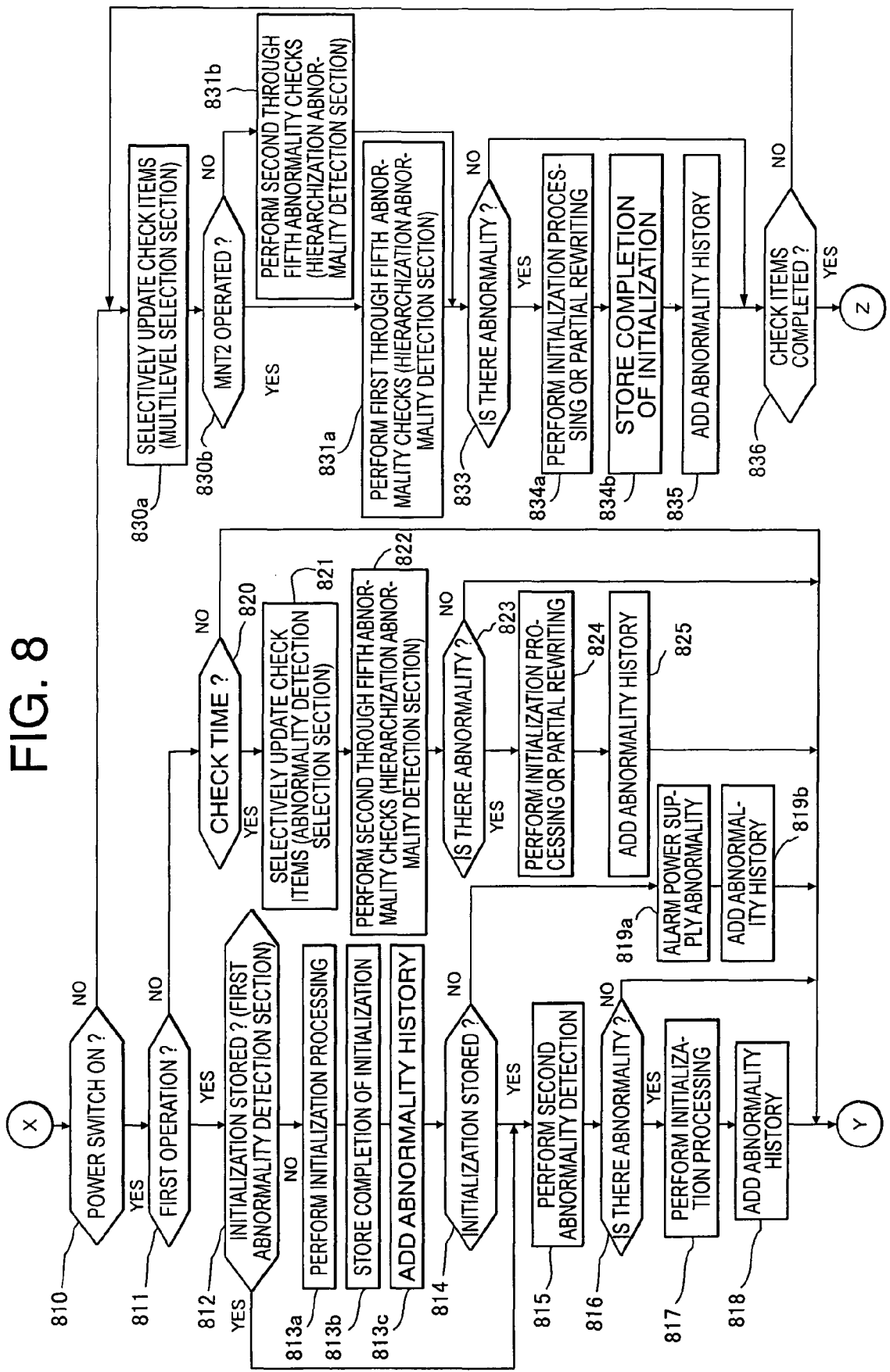
FIG. 8 is a flow chart explaining a partial operation of the vehicle-mounted electronic control apparatus according to the second embodiment of the present invention.

In FIG. 7, first of all, the vehicle-mounted electronic control apparatus 100b is connected to the on-board battery 101 as an external operation before the control CPU 111a is activated (broken line step 700), and subsequently, the power switch 102 is turned on whereby the power supply relay 104 is energized to close the output contact 103b (broken line step 702). As a result, electric power is fed to the control CPU 111a so that the control CPU 111a is started to operate (step 703), and then it generates a watchdog clearing signal WD1 and a self-hold drive signal DR (step 704a). At this time, the watchdog timer circuit 118 generates an operating condition signal output OUTE in response to the generation of the watchdog clearing signal WD1, and holds the conduction of the transistor 130 due to the self-hold drive signal DR, whereby the power supply is made into a self-hold power feed state (broken line step 704b). As a consequence, even if the power switch 102 is opened, the energization of the electromagnetic coil 103a is continuously performed.

Thereafter, by monitoring the inverted logic signal IGS, the control CPU 111a determines whether the power switch 102 continues to be closed (turned on) (step 710a). When it is determined in step 710a that the power switch 102 is closed (turned on) (that is, YES), a processing flow from a relay terminal X to a relay terminal Y in FIG. 8 is executed (step 710b), whereas when it is determined in step 710a that the power switch 102 is opened (turned off) (that is, NO), a processing flow from the relay terminal X to a relay terminal Z in FIG. 8 is executed (step 710b). When the power switch 102 is closed (turned on), the input output control (step 720a) is executed following the step 710b. That is, the electric loads 105 are controlled in response to the operating state of the input sensors 106, the detection output of the analog sensor 107, and the contents of the nonvolatile control memory 112b. Here, note that in the process of the input output control in step 720a, a return is carried out to the successive step 710a where the steps 710b and 720a are carried out in a circulated manner while monitoring whether the power switch 102 is closed.

On the other hand, when the power switch 102 is opened (turned off), by monitoring the logic level of the awake monitor signal MNT2 following executing step 310c, it is determined whether the awake timer circuit part 120b generates an awake output signal WUP (step 711). When it is determined in step 711 that an awake output signal WUP is not generated (that is, NO), it is subsequently determined whether the backup memory 113d has been initialized during the processing of step 710c (step 712). When it is determined in step 712 that the backup memory 113d has not been initialized (that is, NO), important data such as various kinds of learning data, abnormality history data, etc., stored in the backup memory 113d is transferred to and saved into the nonvolatile data memory 112d (step 720b), and the control flow shift to step 713. On the other hand, when it is determined in step 712 that the backup memory 113d has been initialized (that is, YES), the control flow immediately shifts to step 713 (to be described later).

When it is determined in step 711 that an awake output signal WUP has been generated (that is, YES), an awake output signal stop command STP is generated (step 714), and it is then determined whether awake activation is to be executed again (step 715). When it is determined in step 715 that awake activation is to be executed again (that is, YES), the control flow shifts to step 713, whereas when it is determined that awake activation is not to be executed again (that is, NO), the control flow shifts to step 716a. When the determination result in the above step 715 is "YES", or when the determination result in the above step 712 is "YES" (i.e., when an abnormality occurs in the contents of the backup memory 113d, and the backup memory 113d has been initialized in the processing of the step 710c), or following the step 720b (save control: the transfer and save section), the control CPU 111a sends the next awake time data TIME to the awake timer circuit part 120b and then generates an awake operation start command STA (step 713). Subsequently, the self-hold drive command output DR and the other control outputs are stopped, and the watchdog clearing signal WD1 is also stopped (step 716a), and the operation of the control CPU 111a is terminated (step 717). Here, note that in step 316a, in response to the stop of the self-hold drive command output DR or the operating condition signal output OUTE, the power supply relay 104 is de-energized to open the output contact 103b, whereby the power supply holding state is released (broken line step 716b).

Subsequent to the operation termination processing (step 317), the power feed transistor 141 is made conductive to perform awake power feed to the control CPU 111a with the power switch 102 being opened by the awake output signal WUP (broken line step 718). As a result, a return is carried out to step 703 where the control CPU 111a is reactivated.

Next, reference will be made to the specific operation of the abnormality check processing (steps 710b and 710c) in FIG. 7 while referring to FIG. 8.

First of all, reference will be made to processing steps 810 through 825 from the relay terminal X to the relay terminal Y in FIG. 8 (abnormality check step 710b in FIG. 7). By monitoring the inverted logic signal IGS following the relay terminal X in FIG. 8, the control CPU 111a determines whether the power switch 102 continues to be closed (turned on) (step 810). When it is determined in step 810 that the power switch 102 is closed (turned on) (that is, YES), the control flow shift to step 811, whereas when determined that the power switch 102 is opened (that is, NO), the control flow shifts to step 830a (to be described later).

In step 811, it is determined based on the operation of an unillustrated flag whether the current processing is the first processing that is executed for the first time after the power switch 102 was turned on, and when it is determined as the first operation in step 812 (that is, YES), the control flow shifts to step 812, whereas when determined as not the first operation (that is, NO), the control flow shifts to step 820.

In step 812, by reading out and checking whether the RAM memory 123a has stored initialization completion information in the above-mentioned initialization completion storage processing (see FIG. 6) (step 604), it is determined whether there is the storage of initialization completion. When determined in step 812 (the first abnormality detection section) that there is the storage of initialization completion (that is, YES), the control flow shifts to step 815, whereas when determined that there is not the storage of initialization (that is, NO), the control flow shifts to step 813a.

In step 813a, the backup memory 113d is initialized. Subsequently, initialization completion information is transmitted through serial communication, and stored in a specific address of the RAM memory 123a by means of the awake CPU 121a (step 813b). Thereafter, in response to the determination result being "NO" in step 812 (first abnormality detection section), the fact that the step 813a (initialization processing) has been executed is additionally written into a first address of the backup memory 113d as historical information (step 813c), whereby the accumulated value of the number of occurrences or frequency of abnormalities is stored.

Then, in the above step 813b, initialization completion information is transmitted through serial transmission to the RAM memory 123a, and it is reverified whether the RAM memory 123a stores initialization completion information (step 814). When the determination result in step 812 or 814 is "YES" (i.e., the RAM memory 123a stores the initialization completion state), it is determined whether the memory at the specific address in the backup memory 113d correctly stores prescribed specific numeric data (step 815: the second abnormality detection section). Subsequently, the presence or absence of an abnormality is determined as the result of the abnormality check in step 815 (step 423), and when it is determined as the absence of an abnormality (that is, NO), the control flow shifts to the relay terminal Y, whereas when it is determined as the presence of an abnormality (that is, YES), the backup memory 113d is initialized (step 817) and it is written as historical information into a second address of the backup memory 113c that the initialization processing based on the step 815 (second abnormality detection section) has been executed. Then, the accumulated value of the number of occurrences of abnormalities is saved (step 818), and the control flow shifts to the relay terminal Y.

On the other hand, when the determination result in step 814 is "NO" and the initialization completion state is not stored, it is assumed that feeding electric power to awake timer circuit part 120b is not executed due to a break or disconnection of wiring extending to the power supply terminal SLT or abnormality of the stabilization power supply circuit 124, and an alarm display section (not shown) is driven to generate an alarm output to warn the abnormality (step 819a). Subsequently, the accumulated value of the number of occurrences of abnormalities is written and saved as power supply abnormality historical information into a tenth address of the backup memory 113d (step 819b), and the control flow shifts to the relay terminal Y.

On the other hand, when the determination result in step 811 is "NO", in step 820 which is repeatedly executed after the power switch 102 is turned on, a determination is made as to whether it is the time when an abnormality check of the backup memory 113d is to be executed. When determined in step 820 that it is not the time to perform such an abnormality check (that is, NO), the control flow shifts to the relay terminal Y at once, and the processing routine of FIG. 8 is exited, whereas when determined in step 820 that it is the time to perform such an abnormality check (that is, YES), one of the second through fifth check item numbers is selectively determined in a sequential manner (step 821: abnormality detection selection section), and an abnormality detection section for the thus selected item number is executed (step 822: hierarchization abnormality detection section).

Subsequently, the presence or absence of an abnormality is determined as the result of the abnormality check in step 822 (step 823), and when it is determined as the absence of an abnormality (that is, NO), the control flow shifts to the relay terminal Y, whereas when it is determined as the presence of an abnormality (that is, YES), the control flow shifts to step 824). In step 824, the initialization or partial rewriting (to be described later) of the backup memory 113*d* is executed. Finally, it is written as historical information into a n-th address of the backup memory 113*d* that the initialization processing based on an n-th abnormality detection section (step 415) has been executed, and then the accumulated value of the number of occurrences of abnormalities is saved (step 825), and the control flow shifts to the relay terminal Y. The above steps 810 through 825 correspond to the specific processing operation in step 710*b* in FIG. 7, and step 720 in FIG. 7 is executed following the relay terminal Y.

Next, reference will be made to processing steps 830*a* through 836 from the relay terminal X to the relay terminal Z in FIG. 8 (abnormality check step 810*c* in FIG. 7).

When it is determined in the above step 810 that the power switch 102 is in an opened (turned-off) state (that is, NO), the control CPU 111*a* selectively updates the check item by means of the multilevel selection section (step 830*a*). Subsequently, the logic level of the awake monitor signal MNT2 is monitored to determine whether it is under an awake operation (during the save operation) (step 830*b*). When it is determined in step 830*b* that it is under an awake operation (that is, YES), the control flow shifts to step 831*a*, whereas when determined that it is not under an awake operation but in a save operation immediately after the power switch 102 is opened (that is, NO), the control flow shifts to step 831*b*. Here, note that in step 830*a*, one of the first through fifth check item numbers in step 831*a* or one of the second through fifth check item numbers in step 831*b* is selectively determined in a sequential manner, and in step 831*a* or 831*b*, an abnormality detection section for the selected item number is executed, and the steps 831*a* and 831*b* constitute the hierarchization abnormality detection section.

Subsequently, the presence or absence of an abnormality is determined as the result of the abnormality check in step 831*a* or 831*b* (step 833), and when it is determined as the absence of an abnormality (that is, NO), the control flow shifts to step 836, whereas when determined as the presence of an abnormality (that is, YES), the control flow shifts to step 834*a*. In step 834*a*, the initialization or partial rewriting of the backup memory 113*d* (to be described later) is executed.

Then, only when the first abnormality detection section is executed in step 831*a*, initialization completion information is sent to the RAM memory 123*a* (step 834*b*). Also, it is written as historical information into the n-th address of the backup memory 113*d* that the initialization processing based on the n-th abnormality detection section has been executed, and the accumulated value of the number of occurrences of abnormalities is saved (step 835), and then the control flow shifts to step 836. In step 836, it is determined whether the selective update of the check item in step 830*a* has been completed, and when determined that the check item has not been completed (that is, NO), a return to step 830*a* is performed whereas when determined as having been completed (that is YES), the control flow shifts to the relay terminal Z. Here, note that after the return to step 830*a*, a determination according to step 830*b* depends on the first determination result, and once the operation determination of the awake monitor signal MNT2 is executed, the step 830*a* and steps 831*a* through step 836 are repeatedly executed. The above steps 830*a* through 836 constitute the specific processing operation in step 710*c* in FIG. 7, and step 711 in FIG. 7 is executed following the relay terminal Z.

Hereinafter, a supplementary explanation will be given to the entire control flows illustrated in FIG. 7 and FIG. 8. The step 720*b* in FIG. 7 (the transfer and save section) is executed in an "engine stop state" in which the power switch 102 is changed from "turned on" to "turned off" so that a self-hold power feed operation by the power supply relay 104 is carried out. That is, the learning correction data stored in the first area of the backup memory 113*c* according to learning items is transferred to and stored into the first area of the nonvolatile data memory 112*d*, and the abnormality occurrence frequency data stored in the second area of the backup memory 113*c* according to abnormal code numbers is transferred to and stored into the second area of the nonvolatile data memory 112*d*. The transfer and save processing at this time is avoided from being executed according to the determination in step 712 when the backup memory 113*d* has been initialized in the processing in step 710*c* (steps 830*a* through 836 in FIG. 8).

In the initialization processing in FIG. 8 (steps 813*a*, 817, 824 and 834*a*), the contents in the first and second areas of the nonvolatile data memory 112*d* are read out, transferred to and written into the first and second areas of the backup memory 113*d*, and specific numeric data is written into remaining specific addresses, and reset processing is performed with respect to the other addresses of the backup memory 113*d*. In addition, in the hierarchization abnormality detection section (step 822,831*a* and 831*b*), the first abnormality detection section constitutes a check section that makes, in response to the RAM memory 123*a* not storing initialization completion information, a determination that the stored information of the backup memory 113*d* has been lost, too. Also, the second abnormality detection section serves to check whether a memory at a specific address in the backup memory 113*d* correctly stores prescribed specific numerical data. The third abnormality detection section checks the presence or absence of the missing or mixing of bit information by performing a sum check on the entire backup memory 113*d*. The fourth abnormality detection section checks whether the values in the backup memory 113*d* exceed a permitted correction variation range by making a comparison between the contents of the backup memory 113*d* and data related to the permitted correction variation range stored in the nonvolatile control memory 112*b*. The fifth abnormality detection section additionally stores beforehand the inverted logic data to the positive logic data stored in the backup memory 113*d*, and checks whether the inverted logic data and the positive logic data are mutually in an inverted logical relation at the time of abnormality check.

In the initialization processing in steps 824, 834*a*, when an abnormality detection section executed in steps 822, 831*a* or 831*b* (the hierarchization abnormality detection section) determines, according to the fourth or fifth abnormality detection section, that a data memory content at a specific address is abnormal, "partial rewriting" to initialize only the data memory content at the abnormal address is executed. Although in the abnormality detection selection section (step 821), the abnormality check item numbers are updated sequentially, there is a "waiting time" generated between the current abnormality check and the following abnormality check due to the step 820, so the update can be sequentially performed while the operation of the input output control step 720*a* in FIG. 7 is carried out.

On the other hand, though in the multilevel selection section (step 830a), the abnormality check item numbers are sequentially updated, there is no update waiting time generated in this case, so each time one abnormality check is executed, an abnormality check of the following item is continuously carried out. Here, note that in the sum check of the third abnormality detection section, it can be changed in such a manner that the backup memory 113c is divided into a plurality of groups, and a sum check is carried out sequentially according to each unit of division. Moreover, as the section for checking the presence or absence of missing or mixing of bit information, by focusing attention to a remainder obtained by dividing the sum of all the pieces of data by a predetermined constant, there can be used, beside the check sum section, another method such as one for determining through comparison whether a remainder calculated at a check time point and a remainder calculated beforehand are equal to each other.

As described above, the vehicle-mounted electronic control apparatus 100b according to the second embodiment of the present invention includes the main power supply circuit 114a that is supplied with electric power from the on-board battery 101 to generate a first stabilized control voltage upon closure of the power supply switch 102, the control CPU 111a to which electric power is fed by the main power supply circuit 114a, the auxiliary power supply circuit 114b which is directly fed with electric power from the on-board battery 101 to generate a second stabilized control voltage without passing through the power supply switch 102, and the backup memory 113d to which electric power is always or constantly supplied from the auxiliary power supply circuit 114b or the main power supply circuit 114a. Here, the control CPU 111a comprises a microprocessor that controls the various kinds of electric loads 105 based on the contents of the nonvolatile control memory 112b in which the control program and the reference control constants are written and the operating states of the input sensors 106 and the analog input sensor 107. The backup memory 113d stores therein learning correction data with respect to the reference control constants in the nonvolatile control memory 112b.

Also, the vehicle-mounted electronic control apparatus 100b is provided with the awake timer circuit part 120b, and the awake timer circuit part 120b is constituted by the awake CPU 121a comprising a microprocessor that has the nonvolatile awake memory 122a and the RAM memory 123a for arithmetic calculation. Further, the vehicle-mounted electronic control apparatus 100b is provided with the initialization reset section (step 602 in FIG. 6) for the RAM memory 123a, the initialization section (step 813a in FIG. 8) for the backup memory 113d, the initialization completion storage section (step 813b), the hierarchization abnormality detection section (step 822) for the backup memory 113d, and the abnormality detection selection section (step 821).

The awake timer circuit part 120b is constantly fed with electric power from the on-board battery 101 through the stabilization power supply circuit 124, which generates a predetermined stabilized voltage, so that it measures the time during which the main power supply circuit 114a has been interrupted, and awakes and activates the control CPU 111a in the stopped state of the engine by generating an awake output signal WUP thereby to connect the main power supply circuit 114a to the on-board battery 101 when the time measured reaches a predetermined target awake time.

The initialization reset section (step 602) resets the contents of the RAM memory 123a at the time when the awake CPU 121a is activated in response to when the output voltage of the stabilization power supply circuit 124 becomes equal to or more than a predetermined value.

The initialization completion storage section (step 813b) writes and saves the fact that the awake CPU 121a is in an initialization completion state with respect to a specific address of the RAM memory 123a, based on an initialization completion signal which is transmitted through serial communication from the control CPU 111a in response to the completion of initialization of the backup memory 113d by the control CPU 111a.

In addition, the initialization completion storage section (step 813b) includes the initialization storage verification section (step 814) which verifies whether rewriting and changing has been executed, or the voltage monitoring section (voltage monitoring signal MNT1) which monitors whether feeding electric power to the RAM memory 123a is executed.

The initialization section (step 813a) in the control CPU 111a initializes the backup memory 113d in response to when electric power is fed from the main power supply circuit 114a to the control CPU 111a and when the specific address of the RAM memory has not stored the initialization completion state.

The hierarchization abnormality detection section (step 822) constitutes a variety of kinds of abnormality detection sections which are executed by the control CPU 111a to determine whether there is an abnormality in the memory contents of the backup memory 113d, and to initialize the backup memory 113d when an abnormality is detected.

The abnormality detection selection section (step 821) executes a part of the abnormality detection sections in the hierarchization abnormality detection section (step 822) immediately after the power switch 102 is turned on, omits the execution of the other abnormality detection sections even when an abnormality has not been detected in the execution result, and sequentially executes a part or all of the other abnormality detection sections in a repeated manner during the operation of the control CPU 111a.

As described above, the vehicle-mounted electronic control apparatus 100b according to the second embodiment of the present invention is provided with the abnormality check section that serves to check the backup memory 113d at the start of operation of the vehicle, and it is detected by the initialization storage verification section (step 814) or the voltage monitoring section (voltage monitoring signal MNT1) that electric power is fed to the main power supply circuit 114a but not to the stabilization power supply circuit 124. In addition, it is determined, according to the state of the RAM memory 123a cooperating with the awake CPU 121a, whether there is in the past a history of connection interruption or abnormal voltage reduction of the on-board battery 101 even if electric power is fed to the stabilization power supply circuit 124, and the backup memory 113d is initialized at the time of connection interruption or abnormal voltage reduction. Further, during operation of the vehicle, a variety of abnormality detection schemes are sequentially carried out in a repeated manner while focusing on a change or loss of the contents of the backup memory 113d due to excessively large operating noise, whereby it is possible to prevent an excessive and concentrated control load from being placed on the control CPU 111a. Accordingly, the control load of the control CPU 111a can be reduced, thus making it possible to improve its control response as well as the reliability of the backup memory 113d.

Moreover, the hierarchization abnormality detection section (step 822) includes at least one of the first through third abnormality detection sections. The first abnormality detection section (step 812) serves to make, in response to the RAM memory 123a not storing initialization completion information, a determination that the stored information of the backup memory 113d has been lost, too. The second abnormality detection section serves to check whether a memory at a specific address in the backup memory 113d correctly stores prescribed specific numerical data. The third abnormality detection section serves to check the presence or absence of the missing or mixing of bit information by performing a sum check on the entire backup memory 113d, and at least the first abnormality detection section (step 812) is selectively executed immediately after the power switch 102 has been turned on. Accordingly, at the start of operation, the first and second abnormality detection sections are executed for instance, and during operation, the second and third abnormality detection sections are repeatedly executed in a sequential manner, so that a change or loss in the data of the backup memory 113d resulting from connection interruption (disconnection) or abnormal reduction of the on-board battery 101 or excessively large noise, etc., can be efficiently detected.

The multilevel selection section (step 830a) for the abnormality detection sections intensively executes a plurality of abnormality detection sections in the hierarchization abnormality detection section 831a in response to when the control CPU 111a executes an awake operation in the stopped state of the engine, and initializes the backup memory 113d when an abnormality is detected. Accordingly, the contents of the backup memory 113d are checked in detail when the vehicle is parked, and they are initialized beforehand if an abnormality occurs during the parking of the vehicle, so that the engine can be started by performing a simple abnormality check at a busy time when one starts to drive the vehicle.

In addition, the operating sign sensor 109 such as a door sensor, a key sensor, etc., is connected to the awake CPU 121a in the awake timer circuit part 120b, and the awake CPU 121a monitors the operating state of the operating sign sensor 109 and generates an awake output signal WUP prior to the starting of the engine. Accordingly, the contents of the backup memory 113d are checked in detail immediately before the start of operation of the vehicle, and if an abnormality occurs during parking of the vehicle for instance, the backup memory 113d is initialized immediately before the start of operation, so that the engine can be started by performing a simple abnormality check at a busy time when one starts to drive the vehicle.

Moreover, at least one of the fourth and fifth abnormality detection sections is added to the hierarchization abnormality detection section (steps 822, 831a and 831b), and the initialization section is provided with the partial rewrite section (steps 824, 834a). The fourth abnormality detection section checks whether the values in the backup memory 113d exceed a permitted correction variation range by making a comparison between the contents of the backup memory 113d and data related to the permitted correction variation range stored in the nonvolatile control memory 112b. The fifth abnormality detection section additionally stores beforehand the inverted logic data to the positive logic data stored in the backup memory 113d, and checks whether the inverted logic data and the positive logic data are mutually in an inverted logical relation at the time of abnormality check. When it is determined by the fourth or fifth abnormality detection section that the content at a specific address of the backup memory 113d is abnormal, the partial rewrite section (step 824 and 834a) initializes the content at the abnormal address of the backup memory 113d. Accordingly, only abnormal pieces of data can be individually initialized by increasing abnormality check items such as those immediately before the stop of operation, during parking, immediately before the start of operation, during operation except for the state immediately after the start of operation, etc., and by performing a more specific abnormality check.

Further, the main power supply circuit 114a is fed with electric power from the on-board battery 101 through the output contact 103b of the power supply relay 104 that is energized through the power switch 102, and the power supply relay 104 performs a self-hold operation in response to the operation of the control CPU 111a. As a result, it is constructed such that the power feed continues even if the power switch 102 is opened (turned off), and the power supply relay 104 is de-energized in response to the stop of the operating condition signal output OUTE or the self-hold drive command output DR of the control CPU 111a. Also, the main power supply circuit 114a is provided with the transfer and save section (step 720b) that is executed during the self-hold operation of the power supply relay 104, and the nonvolatile data memory 112d that is a save destination. The transfer and save section 720b serves to transfer and save the learning correction data, which is stored in the first area of the backup memory 113d according to learning items into the first area of the nonvolatile data memory 112d, and the abnormality occurrence frequency data stored in the second area of the backup memory 113d according to abnormal code numbers is transferred to and stored into the second area of the nonvolatile data memory 112d.

The initialization section reads out the contents in the first and second areas of the nonvolatile data memory 112d, transfers and writes them into the first and second areas of the backup memory 113d, and specific numerical data is written into remaining specific addresses, and reset processing is performed with respect to the other addresses of the backup memory 113d. Accordingly, immediately after the stop of the operation, the contents of the backup memory 113d are transferred and stored into the nonvolatile data memory 112d so as to reduce the load of the control CPU 111a and save a multitude of pieces of data quickly, so that they can be reused when an abnormality occurs in the contents of the backup memory 113d. Additionally, the capacity of the nonvolatile data memory 112d can be reduced, and initialization processing can be simplified.

Furthermore, the multilevel selection section (step 830a) intensively executes a plurality of abnormality detection sections in the hierarchization abnormality detection section 831b in response to when self-hold power feed is executed due to the opening of the power switch 102, and initializes the backup memory 113d when an abnormality is detected. Accordingly, the contents of the backup memory 113d are checked in detail immediately after the operation of the vehicle is stopped, and they are initialized if an abnormality occurs during the operation of the vehicle, so that the engine can be started with only a simple abnormality check at the busy time of starting the operation of the vehicle.

In addition, the main power supply circuit 114a is connected to the on-board battery 101 through the power feed switching element that responds to an awake output signal WUP from the awake timer circuit part 120b, and the control CPU 111a is awaked and activated in response to power being fed thereto. The power feed switching element is composed of the power feed transistor 141 connected singly to the main power supply circuit 114a. With such an arrangement, the awake output signal WUP is stopped in response to the activation of the control CPU 111a, and the self-hold operation of the power feed switching element (the power feed transistor 141) is executed by the control CPU 111a, and the power feed switching element is opened in response to the stop of the operating condition signal output OUTE or the self-hold drive command output DR of the control CPU 111a. Accordingly, the time required for the awake operation is determined by the control CPU 111a, so the awake timer circuit part 120b is prevented from generating the awake output signal WUP for an extended period of time unnecessarily, thereby making it possible to reduce the power consumption of the on-board battery 101.

Here, note that in the above-mentioned first and second embodiments, a variety of effective timings can be set, as described below, for the times when abnormality check processing for the backup memories 113c, 113d and initialization processing upon abnormality detection are executed. Specifically, the first timing is the time of a brief check immediately after the power switch 102 is turned; the second timing is the time of a sequential detailed check which is time-shared during operation of the vehicle; and the third timing is the time of an intensive detailed check which is executed in an engine stop state immediately after interruption or turn-off of the power switch 102.

Further, in the case of the addition of the awake timer circuit parts 120a, 120b, there are enumerated the following timings: that is, the fourth timing is the time of an intensive detailed check according to awake activation during parking of the vehicle; and the fifth timing is the time of an intensive detailed check according to awake activation immediately before operation of the vehicle by using 109 the operating sign sensor 109 (see FIG. 5).

Moreover, as another timing, an intensive detailed check can be executed immediately after replacement of the on-board battery 101. For instance, an intensive detailed check can be executed by driving the transistor 130 by means of the reset output of the flip-flop circuit 128 (see FIG. 1) thereby to awake and activate the power supply relay 104. Similarly, an intensive detailed check can be executed by driving the power feed transistor 141 to awake and activate the control CPU 111a by means of an awake output signal WUP which is generated in response to the RAM memory 123a (see FIG. 5) having been reset for initialization.

In the above-mentioned first and second embodiments, the first through fifth abnormality detection sections can be selectively used in an appropriate manner. The first abnormality detection section among the first through fifth abnormality detection sections constitutes an abnormality cause detection section that serves to detect an abnormality cause by detecting a power supply interruption or voltage reduction with respect to the backup memories 113c, 113d. The second abnormality detection section is based on a sampling check method according to the save and verification of a specific constant. The third abnormality detection section constitutes an overall estimation section using a sum check, etc. The fourth and fifth abnormality detection sections constitute a detailed check section according to an individual check method.

If an abnormality is detected in either of the above-mentioned abnormality checks, there is a high possibility that an abnormality will be detected in other abnormality checks, so an abnormality check on an item that can be executed in a short period of time is first executed, and if no abnormality is detected, an abnormality check on the following item is executed in a sequential manner, and if an abnormality is detected in either of the abnormality checks, initialization is carried out at that time. However, in order to prevent the stored learning data and abnormality historical information from being carelessly initialized, in the third abnormality detection section, the entire backup memory is divided into a plurality of groups, and a sum check is executed for each of the thus divided groups. Also, it is desirable that the writing of a specific value in the second abnormality detection section be done by dividedly writing in each group of the sum check.

In the above-mentioned first and second embodiments, in order to detect that the on-board battery 101 is connected to the power supply terminal SLT, the output voltage of the stabilization power supply circuit 124 is input to the control CPU 11a as a voltage monitoring signal MNT1, but this can be replaced with a logic circuit for open-circuit detection which serves to detect, as a voltage monitoring signal MNT1, that electric power is not fed to the power supply terminal SLT while electric power is fed from the output contact 103b.

In addition, if the on-board battery 101 and the power supply terminal SLT is reconnected to each other after being once disconnected from each other, such a disconnection can be detected in response to the resetting of the flip-flop circuit 128 (see FIG. 1) or the RAM memory 123a (see FIG. 5 reverified). On the other hand, when the power switch 102 is closed to feed electric power through the output contact 103b in a state where the power supply is not connected due to an abnormality of wiring extending to the power supply terminal SLT, the backup memories 113c, 113d can be initialized based on the voltage monitoring signal MNT1.

Moreover, in the above-mentioned second embodiment (see FIG. 5), by detecting the state that serial communication can not be performed between the control CPU 111a and the awake CPU 121a, it is possible to make a determination that electric power is not fed to the awake CPU 121a.

Further, in the case of the vehicle-mounted electronic control apparatus 100a or 100b being an engine control apparatus, when the power switch 102 is opened (turned off), driving of the variety of kinds of electric loads 105 is generally stopped, as a result of which the operation of an ignition coil or a fuel injection electromagnetic valve (not shown) is ceased, thus stopping the engine. However, the engine can be controlled in such a manner that it is automatically stopped after being continuously operated to run at idle rotational speed so as to be cooled down even after the opening of the power switch 102. In this case, during the low speed operation of the engine or after the stoppage of the engine, it is possible to make an abnormality check on the backup memory 113c or 113d, or transfer and save data into the nonvolatile data memory 112c or 112d.

While the invention has been described in terms of preferred embodiments, those skilled in the art will recognize that the invention can be practiced with modifications within the spirit and scope of the appended claims.

What is claimed is:

1. A vehicle-mounted electronic control apparatus comprising:
   a main power supply circuit that is fed with electric power from an on-board battery to generate a first stabilized control voltage when a power switch is closed;
   an auxiliary power supply circuit that is directly fed with electric power from said on-board battery to generate a second stabilized control voltage without regard to the opening and closing of said power switch;
   a control CPU composed of a microprocessor including a nonvolatile control memory in which a control program and a reference control constant are written; and
   a volatile backup memory that is always fed with electric power through said main power supply circuit or said auxiliary power supply circuit so as to store learned correction data for said reference control constant stored in said nonvolatile control memory;
   wherein said control CPU is connected to a plurality of input sensors and a plurality of electric loads, and is fed with electric power through said main power supply circuit so as to control said plurality of electric loads in response to contents of said nonvolatile control memory and the operating state of said input sensors;

wherein said apparatus further comprises a power supply turn-on detection circuit having a rising differentiating circuit for an input voltage or an output voltage of said auxiliary power supply circuit, and a power supply interruption monitoring memory that is reset by the output of said rising differentiating circuit;

wherein said apparatus further comprises:
  initialization means for initializing said backup memory;
  initialization completion storage means for storing an initialization completion state of said initialization means;
  initialization storage verification means for verifying an initialization completion storage state of said initialization completion storage means;
  hierarchization abnormality detection means for detecting the presence or absence of an abnormality in the storage contents of said backup memory using a plurality of abnormality detection processes; and
  abnormality detection selection means for selecting and determining which one or more of the abnormality detection processes of said hierarchization abnormality detection means should be executed;

wherein said power supply turn-on detection circuit stores the existence of a power supply interrupted state into said power supply interruption monitoring memory by putting the contents of said power supply interruption monitoring memory into a reset state in response to when said auxiliary power supply circuit is connected to said on-board battery;

wherein said hierarchization abnormality detection means executes a plurality of abnormality detection processes including at least a first abnormality detection process, and each of said abnormality detection processes estimates or detects whether there is an abnormality in the memory contents of said backup memory;

wherein said first abnormality detection process makes, in response to when said power supply interruption monitoring memory has not stored a set state, a determination that stored information of said backup memory has been lost;

wherein said initialization means initializes said backup memory by said control CPU when said hierarchization abnormality detection means has estimated that there is an abnormality in the contents of said power supply interruption monitoring memory;

wherein said initialization completion storage means rewrites and changes the contents of said power supply interruption monitoring memory into a set state in response to when said control CPU has completed the initialization of said backup memory, and at the same time, verifies, using said initialization storage verification means or a voltage monitoring signal that an initialization completion state has been stored;

wherein said initialization storage verification means reads out and verifies whether the rewriting and changing of said power supply interruption monitoring memory has been executed to change the reset state into a set state;

wherein said voltage monitoring signal inputs a drive power supply voltage for said power supply interruption monitoring memory to said control CPU whereby said control CPU verifies the storage of initialization by the presence or absence of said voltage monitoring signal, and if the drive power supply voltage has not been supplied to said control CPU, verifies and determines that the storage of initialization has not been made; and wherein said abnormality detection selection means operates in such a manner that immediately after said power switch has been turned on, only some of the abnormality detection processes including said first abnormality detection process of said hierarchization abnormality detection means are executed, while omitting execution of remaining abnormality detection processes in said hierarchization abnormality detection means, and during operation of said control CPU except for immediately after the turning-on of said power supply, a plurality of the remaining abnormality detection processes are repeatedly executed in a periodicity no more than a predetermined period.

2. The vehicle-mounted electronic control apparatus as set forth in claim 1, wherein:
  said power supply turn-on detection circuit includes a Schmitt circuit that has a first threshold and a second threshold higher than said first threshold, for performing a hysteresis operation, and puts the contents of said power supply interruption monitoring memory into a reset state when it is detected that the input voltage or the output voltage of said auxiliary power supply circuit has risen from said first threshold or below to said second threshold or above; and
  said backup memory continues a storage operation when the input voltage or the output voltage of said auxiliary power supply circuit is equal to or higher than a value corresponding to said first threshold.

3. The vehicle-mounted electronic control apparatus as set forth in claim 1, wherein:
  said hierarchization abnormality detection means includes, in addition to said first abnormality detection process, at least one of second and third abnormality detection processes;
  said second abnormality detection process checks whether a memory at a specific address in the backup memory correctly stores prescribed specific numerical data; and
  said third abnormality detection process checks the presence or absence of the missing or mixing of bit information in said backup memory.

4. The vehicle-mounted electronic control apparatus as set forth in claim 3, wherein:
  said hierarchization abnormality detection means includes at least one of a fourth and a fifth abnormality detection process;
  said initialization means further includes a partial rewrite means;
  said fourth abnormality detection process checks whether the values in the backup memory exceed a permitted correction variation range by making a comparison between the contents of the backup memory and data related to the permitted correction variation range stored in the nonvolatile control memory;
  said fifth abnormality detection process stores positive logic data in said backup memory, additionally stores beforehand inverted logic data with respect to said positive logic data, and checks whether said inverted logic data and said positive logic data are mutually in an inverted logical relation with each other at the time of abnormality check; and
  when it is determined by said fourth or fifth abnormality detection process that the content of a memory at a specific address in said backup memory is abnormal, said partial rewrite means initializes the content at said abnormal address in said backup memory.

5. The vehicle-mounted electronic control apparatus as set forth in claim 1,
wherein:
said control CPU further comprises: an engine state detection circuit that detects an operating/stopped state of an engine which is to be controlled, depending upon whether said power switch is closed; an awake timer circuit part; and a third power supply circuit that is always supplied with electric power from said on-board battery to generate a predetermined stabilized voltage;
said nonvolatile control memory further includes a multilevel selection means for sequentially selecting a plurality of the abnormality detection processes of said hierarchization abnormality detection means;
said awake timer circuit part is always fed with power through said third stabilization power supply circuit, and measures the time during which said main power supply circuit has been interrupted, and when said time thus measured reaches a predetermined target awake time, said awake timer circuit part awakes and activates said control CPU in a stopped state of said engine by generating an awake output signal thereby to connect said main power supply circuit to said on-board battery; and
said multilevel selection means sequentially selects and determines, in response to when said control CPU executes an awake operation in the stopped state of said engine which of the plurality of abnormality detection processes of said hierarchization abnormality detection means should be performed, and one or more of the abnormality detection processes thus selected is intensively executed in a state where input and output control is stopped, and initializes said backup memory when an abnormality has been detected.

6. The vehicle-mounted electronic control apparatus as set forth in claim 5, wherein:
said main power supply circuit is connected to said on-board battery through a power feed switching element that responds to an awake output signal from said awake timer circuit part, and awakes and activates said control CPU in response to when electric power is fed to said control CPU;
said power feed switching element comprises an output contact of a power supply relay to feed electric power to said electric loads or a dedicated switching element connecting between said on-board battery and said main power supply circuit;
said awake output signal is stopped in response to activation of said control CPU; and
said power feed switching element is self-held by said control CPU, and is opened in response to the stop of an operating condition signal output or a self-hold drive command output of said control CPU.

7. The vehicle-mounted electronic control apparatus as set forth in claim 3,
wherein said main power supply circuit is connected to said on-board battery through an output contact of a power supply relay which is energized through said power supply switch; nonvolatile data memory is further connected to said control CPU; and said nonvolatile control memory has stored therein transfer and save process, and a specific numerical data which is applied by second abnormality detection process;
said power supply relay self-hold operation is executed in response to the operation of said control CPU so that it continues self-hold feeding of electric power to said main power supply circuit even when said power switch is opened, and it is de-energized in response to the stop of an operating condition signal output or a self-hold drive command output of said control CPU;
said transfer and save process is executed during the self-hold operation of said power relay to transfer and save learned correction data, which has been stored in a first area of said backup memory according to learning items, into a first area of said nonvolatile data memory, and also to transfer and save abnormality occurrence frequency data, which has been stored in a second area of said backup memory according to abnormal code numbers, into a second area of said nonvolatile data memory; and
said initialization means reads out, transfers and writes the contents of said nonvolatile data memory into said first and second areas of said backup memory, writes said prescribed specific numerical data into the remaining specific addresses of said backup memory, and performs reset processing with respect to the other addresses of said backup memory.

8. The vehicle-mounted electronic control apparatus as set forth in claim 7, wherein: said nonvolatile control memory further comprises a control program which is a multilevel selection unit; and
said multilevel selection means sequentially selects and determines, in response to when self-hold power feed is executed due to the opening of said power switch, one or more of the plurality of abnormality detection processes excluding said first abnormality detection process, intensively executes the one or more abnormality detection processes thus selected in a state where input and output control is stopped, and initializes said backup memory when an abnormality is detected.

* * * * *